(12) United States Patent
Dimmen et al.

(10) Patent No.: US 11,110,868 B2
(45) Date of Patent: Sep. 7, 2021

(54) DEVICE FOR SUPPORT OF LOADS

(71) Applicant: HPG AS, Trondheim (NO)

(72) Inventors: Helge Åsteson Dimmen, Trondheim (NO); Pål Bierman Jørgensen, Trondheim (NO); Teo Raanaas Tandberg, Trondheim (NO); Jens Harald Seiertun, Oslo (NO); Martin Gudem Ringdalen, Trondheim (NO)

(73) Assignee: HPG AS, Trondheim (NO)

( * ) Notice: Subject to any disclaimer, the term of this patent is extended or adjusted under 35 U.S.C. 154(b) by 29 days.

(21) Appl. No.: 16/607,910

(22) PCT Filed: Apr. 26, 2018

(86) PCT No.: PCT/IB2018/052886
§ 371 (c)(1),
(2) Date: Oct. 24, 2019

(87) PCT Pub. No.: WO2018/198055
PCT Pub. Date: Nov. 1, 2018

(65) Prior Publication Data
US 2020/0180515 A1    Jun. 11, 2020

(30) Foreign Application Priority Data

Apr. 26, 2017   (NO) .................................. 20170694

(51) Int. Cl.
*B60R 9/042*      (2006.01)
*A47B 88/45*      (2017.01)
(Continued)

(52) U.S. Cl.
CPC .............. *B60R 9/042* (2013.01); *A47B 88/45* (2017.01); *A47B 88/457* (2017.01);
(Continued)

(58) Field of Classification Search
CPC ....... A47B 88/45; B60R 9/042; B60R 9/0423; B60R 9/0426
(Continued)

(56) References Cited

U.S. PATENT DOCUMENTS

| 5,544,796 A | 8/1996 | Dubach |
| 7,513,730 B2 * | 4/2009 | Goyanko ................ B60R 9/042 224/310 |

(Continued)

FOREIGN PATENT DOCUMENTS

| CA | 2490751 A1 | 6/2006 |
| DE | 4229762 A1 | 3/1993 |

(Continued)

OTHER PUBLICATIONS

International Search Report issued in International Application No. PCT/IB2018/052886, dated Apr. 26, 2018 (5 pages).

(Continued)

*Primary Examiner* — James Keenan
(74) *Attorney, Agent, or Firm* — Osha Bergman Watanabe & Burton LLP

(57) ABSTRACT

A raising and lowering device for support of load, where the raising and lowering device includes a first beam, a second beam, and at least one profile element. Each of the first and the second beam is connected to the at least one profile element through at least one strut. One end of each strut is supported through a slide and pivot connection and an opposite end of each strut is supported through a pivot connection. The device further includes at least one synchronizing element rotatably supported at each end of the at least one profile element. The at least one synchronizing element extends in a loop substantially around the entire length of the profile element, to which at least one synchronizing element each of the first and second beams, via a (Continued)

bracket, is connected to such that the first and second beams are movable relative to each other between a retracted position and an extended position of the raising and lowering device.

18 Claims, 23 Drawing Sheets

(51) Int. Cl.
    *A47B 88/473* (2017.01)
    *A47B 88/493* (2017.01)
    *A47B 88/457* (2017.01)
    *A47B 96/07* (2006.01)
    *B60R 9/045* (2006.01)

(52) U.S. Cl.
    CPC ........... *A47B 88/473* (2017.01); *A47B 88/493* (2017.01); *A47B 96/07* (2013.01); *B60R 9/045* (2013.01)

(58) Field of Classification Search
    USPC .......................................... 224/310
    See application file for complete search history.

(56) References Cited

U.S. PATENT DOCUMENTS

| | | | |
|---|---|---|---|
| 8,322,580 | B1 | 12/2012 | Hamilton |
| 9,290,130 | B2 * | 3/2016 | Buller .................. B60R 9/10 |
| 2006/0280583 | A1 | 12/2006 | Settelmayer et al. |
| 2007/0175936 | A1 | 8/2007 | Goyanko |

FOREIGN PATENT DOCUMENTS

| | | | | |
|---|---|---|---|---|
| DE | 68903356 | T2 | 4/1993 | |
| DE | 20002018 | U1 * | 5/2000 | ............. B60R 9/042 |
| DE | 102014107692 | A1 | 12/2015 | |
| EP | 568855 | A1 | 11/1993 | |
| EP | 1619079 | A2 | 1/2006 | |
| GB | 2073686 | A | 10/1981 | |
| GB | 2315015 | A | 1/1998 | |
| JP | H0728741 | U | 5/1995 | |
| NO | 20160195 | A1 | 8/2017 | |
| WO | 2013063683 | A1 | 5/2013 | |
| WO | WO-2017134480 | A1 * | 8/2017 | ............. B60R 9/042 |

OTHER PUBLICATIONS

Written Opinion issued in International Application No. PCT/IB2018/052886; dated Apr. 26, 2018 (5 pages).

Search Report Issued in Norwegian Application No. 20170694; dated Oct. 21, 2017 (2 pages).

* cited by examiner

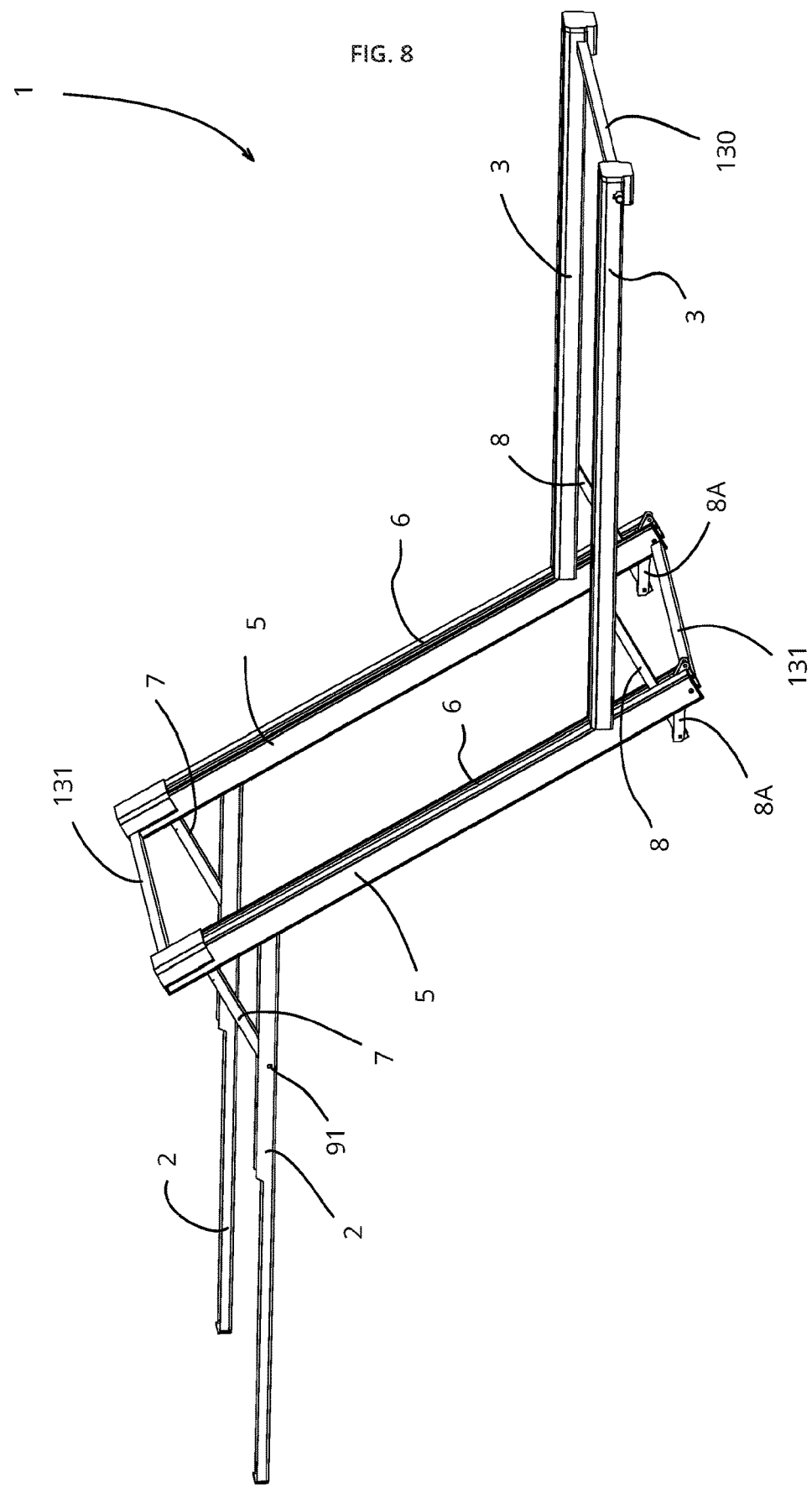

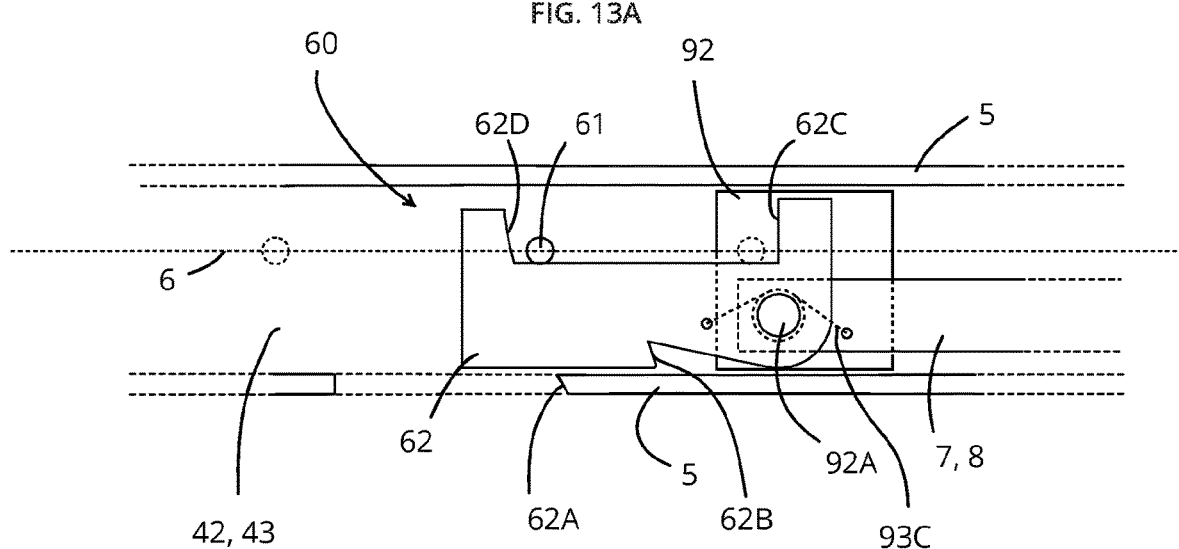
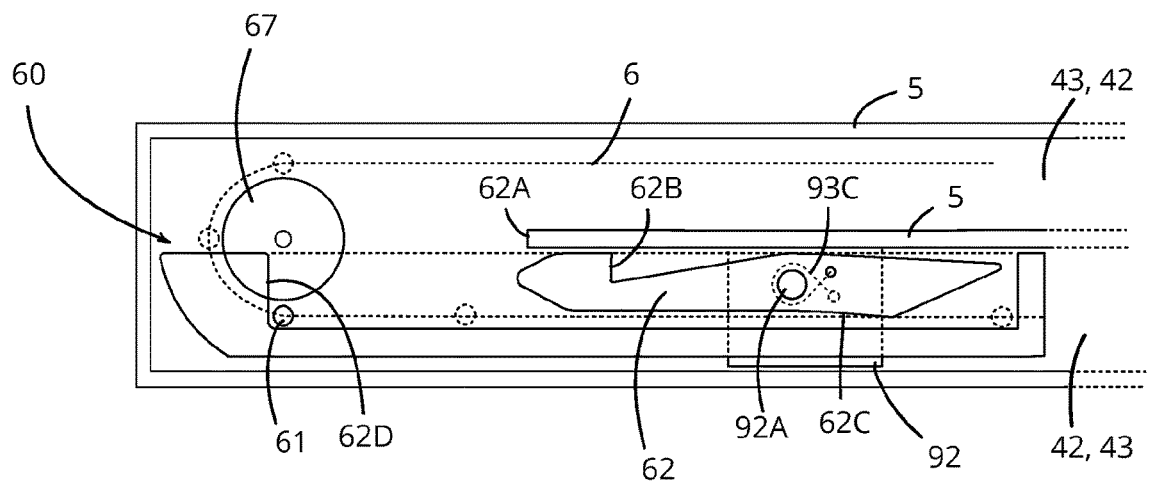
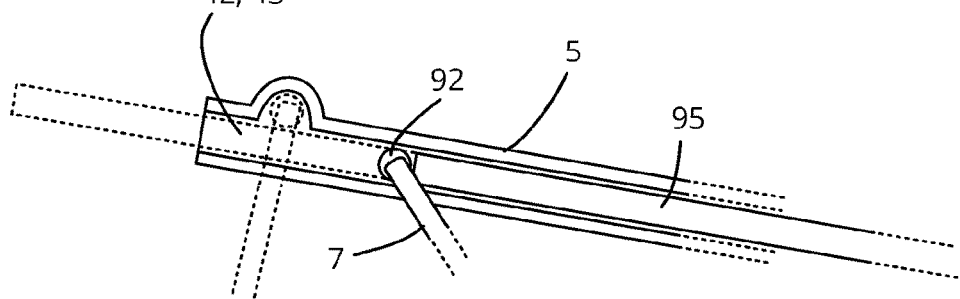

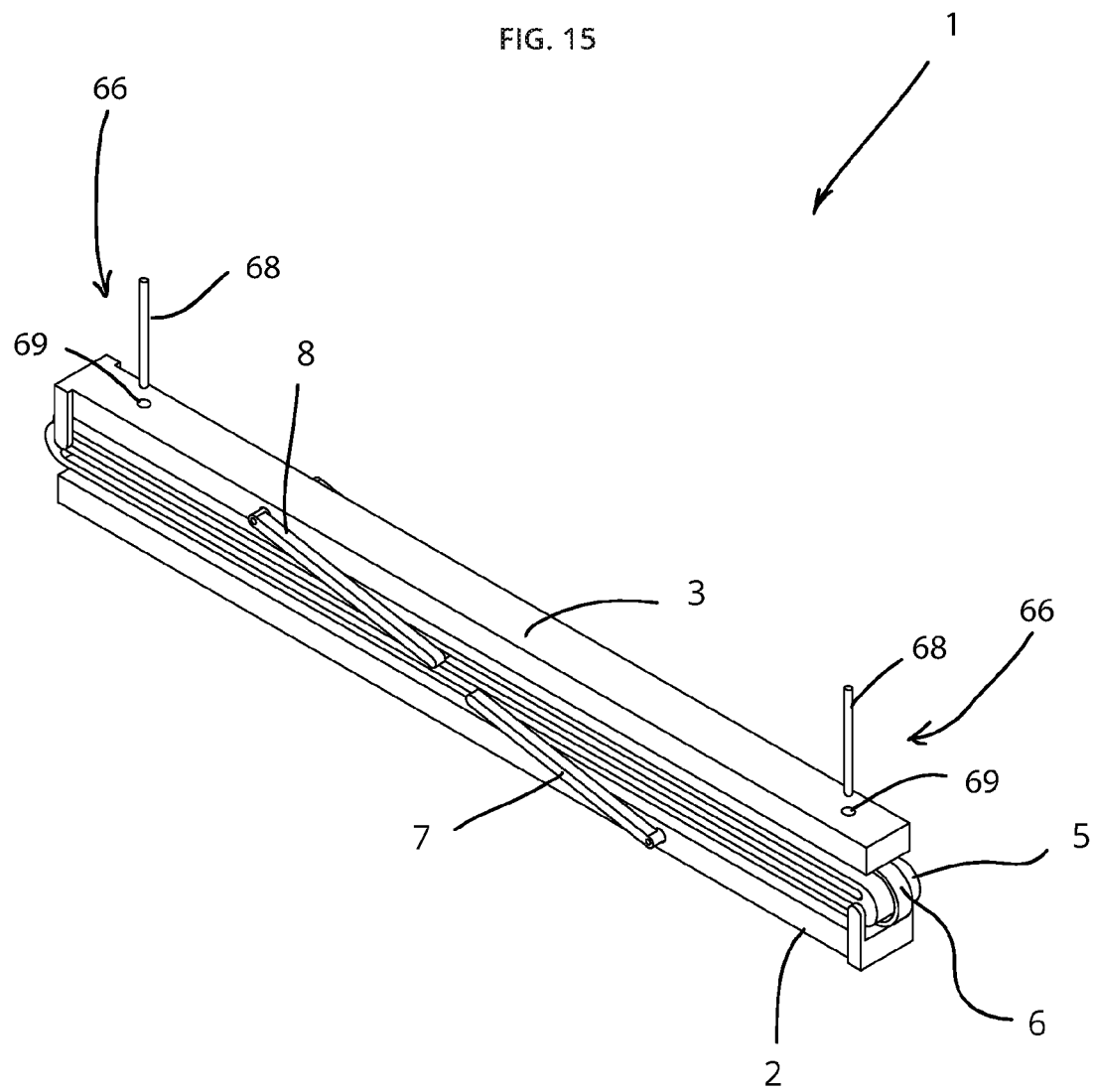

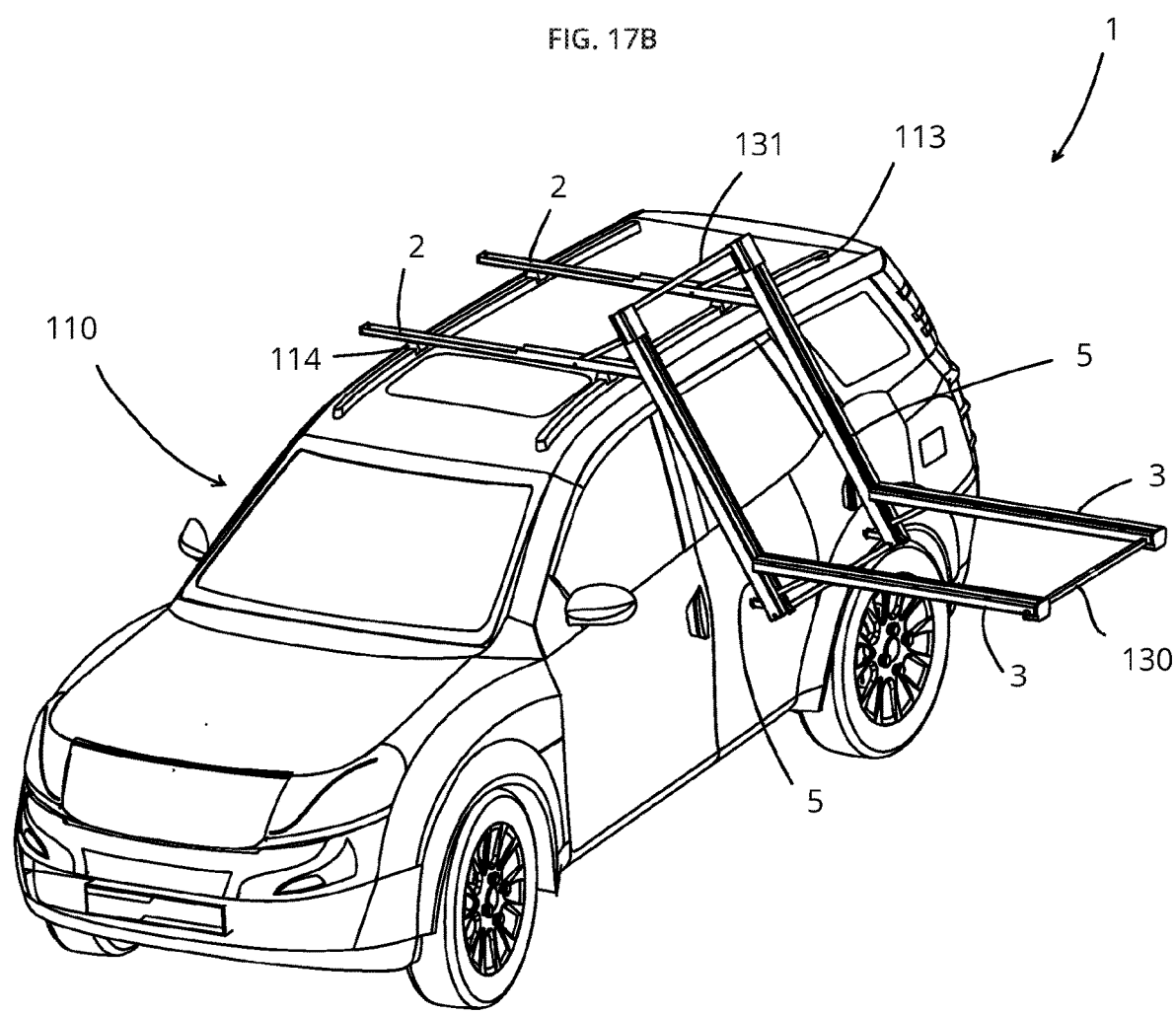

DEVICE FOR SUPPORT OF LOADS

BACKGROUND

The present application generally relates to a raising and lowering device for support of a load, where the load is moved from one level to another level.

More particularly, the present invention relates to a raising and lowering device for vehicles, cabinets or the like, wherein the raising and lowering device is used in connection with loading and unloading as well as securing of load.

Often, ordinary passenger vehicles are used to transport objects that are too large to fit into the compartment of the vehicle or the interior of the vehicle. A rack or roof rack is therefore used to attach and secure objects, such as skis, bicycles or luggage on the roof of a vehicle. The objects must then be lifted to the height of the roof of the vehicle and lifted down again. Since this can be difficult, especially for heavy and bulky objects, roof racks that include auxiliary lifting mechanisms have been described, for example, in DE 42 29 762, EP 568 855 and GB 2,073,686.

U.S. Pat. No. 5,544,796 relates to a roof rack for vehicles, where the roof rack is equipped with comprising two parallel tracks having a roof section and a pivotal auxiliary section. For loading or unloading articles, the auxiliary sections are positioned to extend outward and downward from the ends of the roof sections for forming a continuous, rigid track. Sleighs can be displaced along these tracks. The sleighs are guided such that they are not tilted but retain their orientation during displacement. The roof rack is easy to construct and also suitable for heavy and high articles.

EP 1,619,079 A2 relates to a load carrying device, where the load carrying device fits on the outside of a vehicle. It has a first part fixed to the vehicle, and a second part to which the load to be carried can be fixed, or of which takes the load to be carried. For loading and unloading, the second part is movable by means of a guide device relative to the first part between the using or driving position, and a loading position.

CA 2.490.751 A1 relates to a luggage carrier for a vehicle, where the luggage carrier includes a guide member mounted to the roof of a vehicle, wherein the guide member defines a substantially horizontal first path, and a carriage movably mounted to and configured to follow the guide member along the first path. The carriage comprises a moveable support member configured to receive an object to be carried by the carrier. The carriage also comprises an elevating system for elevating the support member along a second path between a raised height and a lowered height.

US 2007/175936 A1 relates to a rack for a vehicle roof, where the rack is a mechanized device for loading and unloading cargo onto and from a roof of a motor vehicle for transport. The rack includes a pair of horizontal support frame members mounted either directly on the roof of the vehicle, or onto an existing vehicle roof rack. A cargo carrying rack is mounted on cargo carrying arms, which are pivotally and slidably attached to a pair of traveling support arms that are, in turn, pivotally and slidably linked to the frame members. In some embodiments, a motor and gear train raise and lower the cargo carrying rack to and from the roof for loading and unloading cargo. In other embodiments, the cargo carrying rack is raised and lowered manually, with articulated stabilizer arms having a ratchet mechanism at one end and a spring-biased pulley at the other end dampening the speed of deployment.

NO 341561 B1 relates to a raising and lowering device for supporting of load, where the raising and lowering device comprises a first beam and a second beam which are movable relative each other, where a first profile element further is slidably connected to the first beam and a second profile element is slidably connected to the second beam, which first and second profile elements further are slidably in contact with each other, where the first profile element further through a strut is connected to the second beam, while the second profile element through the strut is connected to the first beam, where the first and the second beam is movable relative each other between a retracted position and an extended position of the raising and lowering device.

WO 2013/063683 A1 relates to a roof rack for loading and unloading cargo to and from the roof of a vehicle. The roof rack is characterized by enabling the cargo to be loaded at an accessible height and then lifted onto the roof of the motor vehicle while the cargo is maintained in a fixed position. In another embodiment, the cargo is reoriented from a first orientation to a second orientation during the loading and unloading procedure.

The above solutions are based on complex constructions. Moreover, the solutions will have a more limited loading area, so that less load can be transported with the vehicle. In addition, there may be a danger that the object or objects during lifting or lowering may fall onto the vehicles, on the ground and/or on person(s), so to injury or damage the person, the object and/or vehicle.

SUMMARY OF DISCLOSURE

An object of the present invention will therefore be to seek to solve one or more of the above-mentioned problems or disadvantages.

Still another object of the present invention will be to provide a raising and lowering device for support of load, where the raising and lowering device is easy to use, comprises a small number of parts and utilizes the entire loading surface.

These objects are achieved with a raising and lowering device for support of load according to the present invention by the features set forth in the following independent claim, where further features of the invention appear from the dependent claims and the description below.

The present invention relates to a raising and lowering device for supporting of load, where the raising and lowering device comprising a first beam, a second beam and at least one profile element, where each of the first and second beams through at least one strut is connected to the least one profile element, where the device further comprises at least one synchronizing element extending over a surface of the at least one profile element, to which at least one synchronizing element each of said first and second beams is further connected, so that the first and second beams are movable relative to each other between a retracted and an extended position of the raising and lowering device.

An end of each strut which connects the profile element and the first and the second beam, respectively, will suitably be connected to the at least one profile element and an opposite end of each element will suitably be connected to the first and the second beam respectively.

In one embodiment of the present invention there may be provided at least one coupling strut between each strut which connects the profile element and the second beam. The coupling strut will then, through one of its ends, be connected to one end of the strut, where this end of the strut is opposite the end which is connected to the second beam and through an area which is in the vicinity of a second end of the coupling strut, be connected to the profile element.

The connection between the coupling strut and the strut, and the connection between the coupling strut and the first profile element, is preferably a pivot connection or a sliding pivot connection, for example a bolt and nut connection, a roller connection, a groove and guide connection or the like, so as to permit a turning or rotation of the different elements in relation to each other when the raising and lowering device is moved from a retracted position to an extended position and vice versa.

The first beam may be configured to be connected to, for example, a vehicle, a cabinet or the like, while the second beam may form a support for a load.

According to the present invention at least one synchronizing element is arranged longitudinally around an outer surface of the at least one profile element, thus forming a closed loop or an endless element along the profile element. By arranging a driving device in the form of a pulley, pinion, gear or the like near each end of the profile element, the synchronizing element may be driven around the profile element. Through the design of the synchronizing element and the connection between the synchronizing element, the first beam and the second beam, the movement between the first beam and the second beam will synchronize when the raising and lowering device is moved between a retracted position and an extended position and vice versa. The synchronizing element may be in the form of a toothed belt, a belt, a chain, a drive or the like.

The synchronizing element is arranged to be movable at least in a closed loop along the profile element. The attachment between the profile element and the synchronization element may comprise pulleys or pinions suitably designed to guide the synchronizing element in a loop along the profile element. A length of the synchronizing element located on an upper side of the profile element will then be able to move in an opposite direction of a length of the synchronizing element located on an underside of the profile element when the raising and lowering device for support of load is brought from a retracted position to an extended position and vice versa. A person skilled in the art would also appreciate that the synchronizing element could include electrically controlled devices in form of one or more synchronized linear transfers. As the person skilled in the art will know how such a system can be designed, this is not described further herein.

In order to allow rotation of each of the first and second beam relative to the profile element, each strut which is arranged between the first beam and the second beam and the profile element, for example at one end of each strut connected to the profile element, can be pivotable and slidably supported, while an opposite end of each strut connected to the first beam, respectively, the second beam can be pivotally supported. A person skilled in the art will, however, appreciate that these supports can be carried out opposite, since each strut can be pivoted and slidably supported to the first beam, respectively, the second beam, and through its opposite end may be pivotally supported to the profile element.

Further, each of the first and second beams may be formed with at least one guiding device for at least one control device which is connected to or integrated into each of the struts. In one embodiment of the present invention, the guiding device may comprise one or more slots or grooves formed in each of the first and second beams, where the slot/slots or groove/grooves may extend at least over a part of each of the first and second beams length. In one embodiment of the present invention, the slot or slots may be designed to extend substantially over the entire length of the first and second beam.

The control device(s) which is/are connected to or integrated in each of the struts may be in the form of a bolt, pin, carriage or the like that is designed to be pushed in the slot or slots formed in the first and second beam. The control device(s) may further be designed to allow a rotation of the first and second beam when the control device is located at a given position in the guiding device.

It could also be envisaged that the guiding device may comprise one or more grooves disposed in a surface of the profile element, where the control device formed in each of the struts may be a protruding element formed with a complementary shape of the groove.

It could also be envisaged that the guiding devices and the control devices can occur in a combination, as shown below, for example:

One strut may slide in the first beam and another strut may slide in the second beam,
One strut may slide in the first beam and another strut may slide in the profile element,
One strut may slide in the profile element and another strut may slide in the second beam,
One strut may slide in the profile element and another strut may slide in the profile element.

The groove or grooves formed in the profile element may be of any shape that allows the profile element, struts and beams to be controlled, for example, a T-shape, a reverse T-shape, an I-shape, or the like.

Each of the first and second beams may be formed with a control device in the form of a roller, pin or similar, to guide the first and second beam in and along guiding devices formed longitudinally in the profile element, where the first and second beam's control device in a configuration will be able to use the same guiding device as the struts.

The struts and the profile element will in the above-mentioned embodiments first be able to undergo a sliding, linear motion over a certain distance and then a rotating motion using the raising and lowering device according to the present invention, when the raising and lowering device is brought from a retracted position to an extended position, and vice versa as it is brought from an extended position to a retracted position.

According to the present invention, the raising and lowering device may comprise one or more locking devices where one or more of the locking devices may be designed to ensure that the components of the raising and lowering device do not move inadvertently relative to each other, for example in relation to rotation, in relation to linear motion, etc.

One or more of the locking devices may then be designed, for example, to allow rotation between the struts, the first and the second beam or the profile element, only after that the raising and lowering device is pulled horizontally out a certain distance from its retracted position (or when the raising and lowering device is to be pushed in from its extended position to its retracted position), as the struts, after this distance, are allowed to rotate. Likewise, one or more of the locking devices may be designed, for example, to allow sliding of the struts only when the struts are arranged in parallel or substantially in parallel with the profile element and/or the first, respectively, the second beam.

One or more of the locking devices may in an embodiment suitably interact or cooperate with the synchronizing element so that a coupling device on the synchronizing element can lock and unlock one or more of the locking devices.

A resistive device may also be used which prevents slideback of the control device(s) in the guiding device(s) when the control device(s) has/have moved the maximum distance in relation to an initial position (i.e., the retracted position of the raising and lowering device), where the resistive device will allow a rotation of the control device(s) without the control device(s) moving in a longitudinal direction in relation to the guiding device(s).

In order to ensure that the raising and lowering device for support of load according to the present invention is not lowered/raised unintentionally, for example during transport by vehicle, the raising and lowering device may be locked in a certain position, for example a retracted position, where this may be achieved, for example, by using at least one locking pin, safety bolt or the like, thus locking and preventing movement between the various elements of the raising and lowering device.

In order to facilitate the handling of the raising and lowering device for support of load when it is brought from a retracted position to an extended position or from an extended position to a retracted, the raising and lowering device for support of load according to the present invention may comprise one or more accessory devices in the form of one or more pneumatic or hydraulic cylinders, one or more mechanical springs, one or more motors, one or more winches, or one or more pulleys, where this or these, for example, may be arranged between the first beam and the first profile element, and/or between the second beam and the first profile element. A person skilled in the art will appreciate that the accessory device(s) may also be arranged between other components of the raising and lowering device, whereby this is not described any further herein. Further, the raising and lowering device may be provided with a damping device in the form of a rotary damper, linear damper, spring or the like, to reduce the speed of the elements rotations and/or movement in relation to each other.

The raising and lowering device for support of load according to the present invention could be envisaged to be designed symmetrically of, for example, a common center of gravity on the profile element, but it should be understood that the raising and lowering device for support of load may be designed asymmetrically.

The present invention also comprises a system in which two or more raising and lowering devices for support of load can be assembled to form the system, so that the system can support a heavier load, form a larger surface for support of load etc. A number of coupling devices may then be used in order to connect and stiffen two raising and lowering devices, where, for example, a coupling device may be arranged at a forward end and a coupling device may be arranged at a rear end of the raising and lowering devices. Such a coupling device may further be adjustable, for example, by the use of telescopic rods, two rods connected with an adjustment sleeve, or the coupling device(s) may be of a fixed length, for example a fixed rod. A person skilled in the art will know that more or further coupling devices may be used, where these may be arranged between corresponding elements of the raising and lowering devices. The coupling devices may further be designed with means for connection to the raising and lowering devices for support of load, where such means may be threads, bolt and nuts, stiffening brackets or the like.

The raising and lowering device of the present invention may in one embodiment be used as a roof rack for vehicles. In another embodiment, the raising and lowering device of the present invention may be used, for example, for lowering and raising of cabinets in kitchen, for lowering and raising shelves and/or drawers in (wardrobe) cabinets etc.

Further objects, structural embodiments and advantages of the present invention will become apparent from the following detailed description, the accompanying drawings and the appended claims.

BRIEF DESCRIPTION OF DRAWINGS

The invention will now be explained by several non-limiting embodiments with reference to the accompanying drawings wherein:

FIG. 2A shows the raising and lowering device in a fully retracted position, while FIG. 2B shows the raising and lowering device in a completely extended position, FIG. 3A shows the raising and lowering device in an almost retracted position, while FIG. 3B shows the raising and lowering device in a completely extended position, FIG. 4A shows the assembled elements of the raising and lowering device in a perspective view, while FIG. 4B shows a cross-section of the assembled elements of the raising and lowering device according to FIG. 4A, FIG. 8 shows the raising and lowering devices for support of load according to the above embodiments which in an alternative embodiment are connected to each other with help from several coupling devices between the elements, viewed from the side in the extended position, FIG. 11A shows a linear locking device, and FIG. 11B shows a rotary locking device, FIG. 12A shows an embodiment of the locking device which prevents two elements from rotating relative to each other, while FIG. 12B shows the locking device according to FIG. 12A in a perspective view, FIGS. 13A-13B show details of locking devices that interact or cooperate with an activation element controlled by the synchronizing element, where the locking devices are coupled to a control device at one end of a strut, FIG. 13C shows an embodiment of a linear blocking mechanism for an alternative locking device, FIG. 15 shows a locking device in the raising and lowering device for support of load, to ensure that the raising and lowering device is not lowered/raised inadvertently, for example during transport by vehicle, FIGS. 17A-17E show different uses of the raising and lowering device for support of load according to present invention.

DETAILED DESCRIPTION

Figure 1:
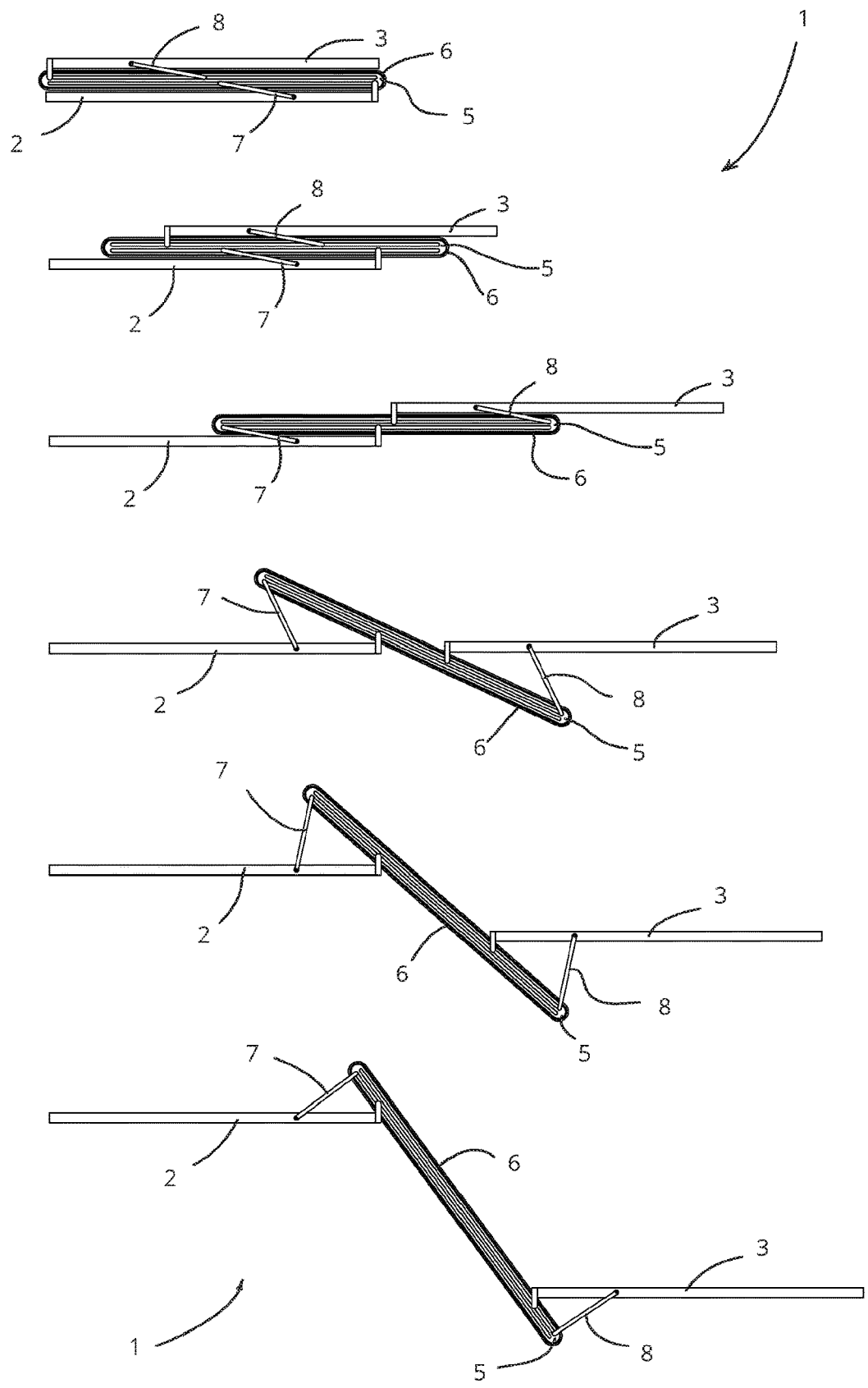
FIG. 1 shows a principal view of a raising and lowering device for support of load according to the present invention, where the raising and lowering device is shown moved from a fully retracted position at the top to a fully extended position at the bottom.

FIG. 1 shows a raising and lowering device 1 for support of load according to the present invention, where the raising and lowering device 1 is shown in a retracted position at the top of FIG. 1 and in an extended position at the bottom of FIG. 1. The "still images" which are arranged between the upper and a bottom figure show how the raising and lowering device 1 is brought from the retracted to the extended position.

The raising and lowering device 1 for support of load according to the present invention comprises a first and a second beam 2, 3, at least one profile element 5, at least one synchronizing element 6 and struts 7, 8. When the raising and lowering device 1 according to the present invention is in its retracted position, as shown at the top of FIG. 1, said elements 2, 3, 5, 6, 7 and 8 will be arranged adjacent one another so that the raising and lowering device 1 has a relatively small extent in height and width.

When the raising and lowering device 1 is to be used, i.e. be brought from its retracted to its extended position (as shown at the bottom of FIG. 1), a user will grab the second beam 3 and pull the second beam 3 out horizontally from the raising and lowering device 1. The structural design of the raising and lowering device 1 will be explained in more detail below and described with respect to FIGS. 2A-3B. Alternatively, the raising and lowering device 1 could be connected to one or more motors or the like, whereby the motor or motors will provide a movement of the raising and lowering device 1 between the retracted and the extended position and vice versa.

When the second beam 3 has been pulled out horizontally to a certain distance, near the end of the first beam 2, the profile element 5 will begin to rotate and move away from the first beam 2 and the second beam 3, so forming an angle with the first and second beam 2, 3. The first and second beams 2, 3 are connected to the synchronizing element 6. Thus, the first and second beams 2, 3 will move apart at an equal rate relative to the profile element.

Finally, the second beam 3 will be brought to a position as shown at the bottom of FIG. 1, where the raising and lowering device 1 will then be in its extended position. In this position a load can be placed on the second beam 3 and thereafter the process can be repeated in reverse order to bring the load to the retracted position of the raising and lowering device 1.

Figure 2A:
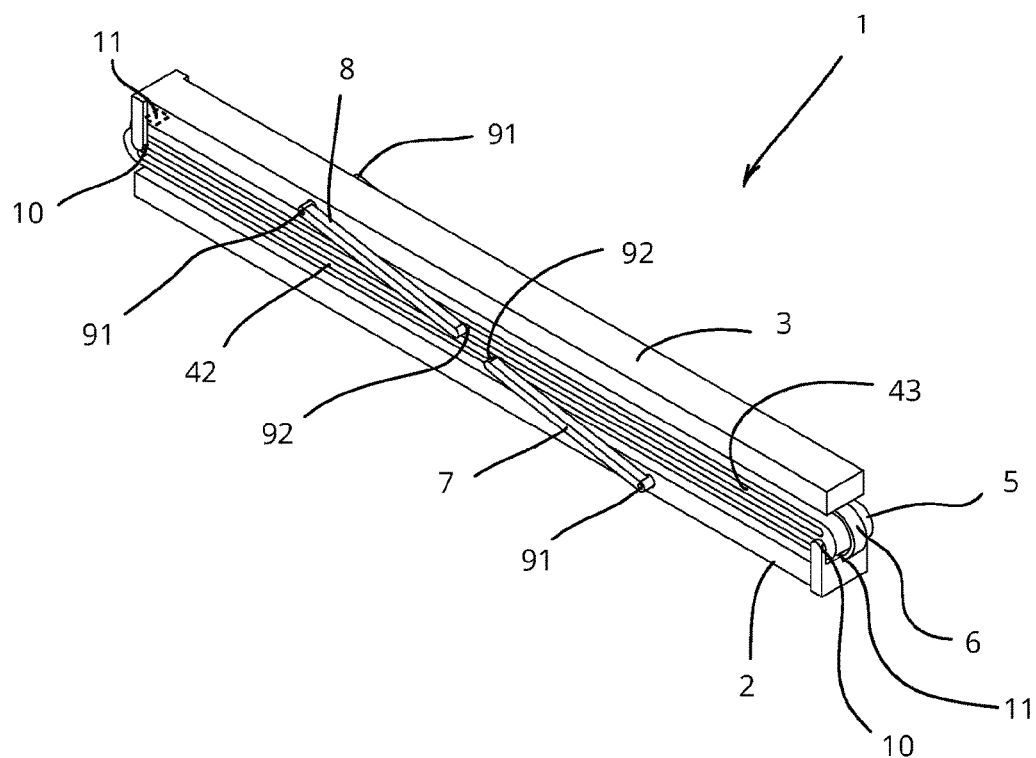
FIGS. 2A-2B show details of a first embodiment of the raising and lowering device according to FIG. 1, where
Figure 2B:
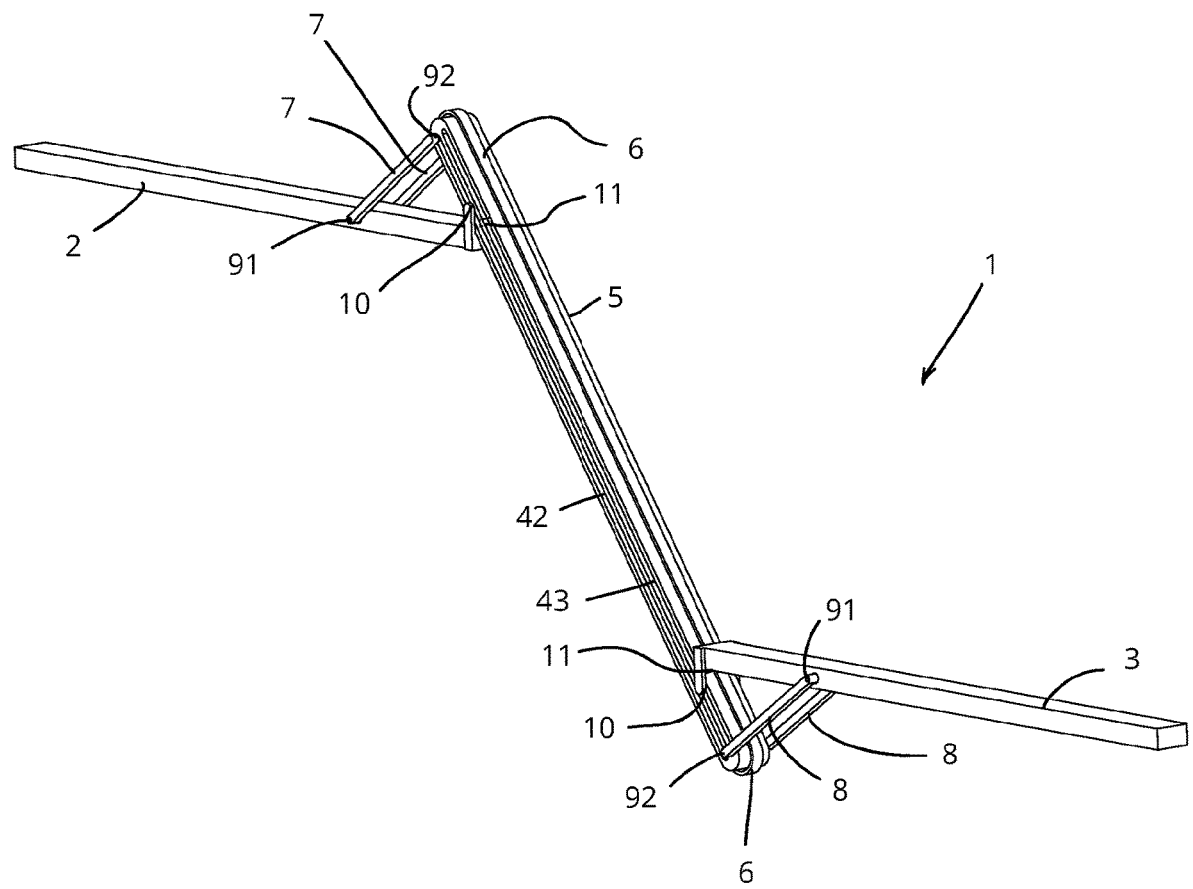

FIGS. 2A-2B show details of a first embodiment of the raising and lowering device 1 according to the present invention, where FIG. 2A shows the raising and lowering device 1 in a retracted position and FIG. 2B shows the raising and lowering device 1 in an extended position.

The first beam 2 is suitably designed to be attached to a desired surface, for example a vehicle roof, a cabinet or the like, see also FIGS. 17A-17E.

The first beam 2 is further formed with a bracket 11 or the like, which bracket 11 connects the first beam 2 in an appropriate way to the synchronizing element 6 and a control device 10 in the form of a bolt, pin or the like, which will then cooperate with a guiding device 42 designed in the profile element 5. A strut 7 is further pivotally supported in the first beam 2 via a pivot connection 91, where the pivot connection 91 may, for example, be in the form of a bolt, pin, carriage or the like.

The profile element 5 is formed with two slots or grooves 42, one on each side of the profiled element 5, where the slots or grooves 42 will constitute guiding devices for control devices 10 connected to brackets 11, and where it in each slit or groove 42 is arranged a control device 92 which is connected to one end of the strut 7. The slots or grooves 42 will form a guiding device for the control device 92 and the strut 7, where the control device 92 may, for example, be a sliding and rotating connection in the form of a bolt, pin, carriage or the like.

Further, the profile element 5 is formed with two slots or grooves 43, one on each side of the profile element 5 and adjacent the slots or grooves 42, where it in each slot or groove 43 is arranged a control device 92 connected to an end of the strut 8. The slots or grooves 43 will form a guiding device for the control device 92 and the strut 8, where the control device 92 may, for example, be a sliding and rotating connection in the form of a bolt, pin, carriage or the like.

A second beam 3 is similar to the first beam 2 formed with a bracket 11 or the like, which bracket 11 connects the second beam 3 to the synchronizing element 6 and a control device 10 in the form of a bolt, pin, carriage or the like, with the slots or guiding device 43 which are formed in the profile element 5. Strut 8 is rotatably supported in the second beam 3 via a pivot connection 91 which may, for example, be in the form of a bolt, pin, shaft or the like.

A synchronizing element 6 which is arranged as an endless loop around the profile element 5, is rotatably supported at each end of the profile element 5 and is further connected to the first and second beams 2, 3, via brackets 11.

The guiding devices 42, 43, the control devices 92, 10, the pivot connections 91, the brackets 11 and the synchronizing element 6 will cause the different elements 2, 3, 5, 7, 8 to move and rotate relative to each other.

In FIGS. 2A-2B there is shown the use of two struts 7 and two struts 8, but a person skilled in the art will understand that the raising and lowering device 1 for support of load can also be designed with only one strut 7 and one strut 8, where, for example, struts 7 may be arranged on one side of profile element 5, while struts 8 may be arranged on the same or opposite side of the profile element 5.

Figure 3A:
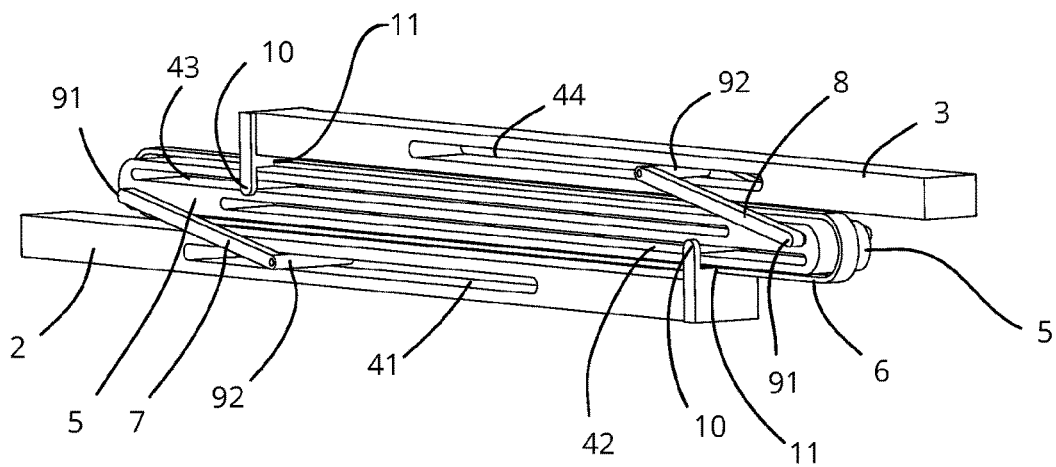
FIGS. 3A-3B show details of a second embodiment of the raising and lowering device according to FIG. 1, where
Figure 3B:
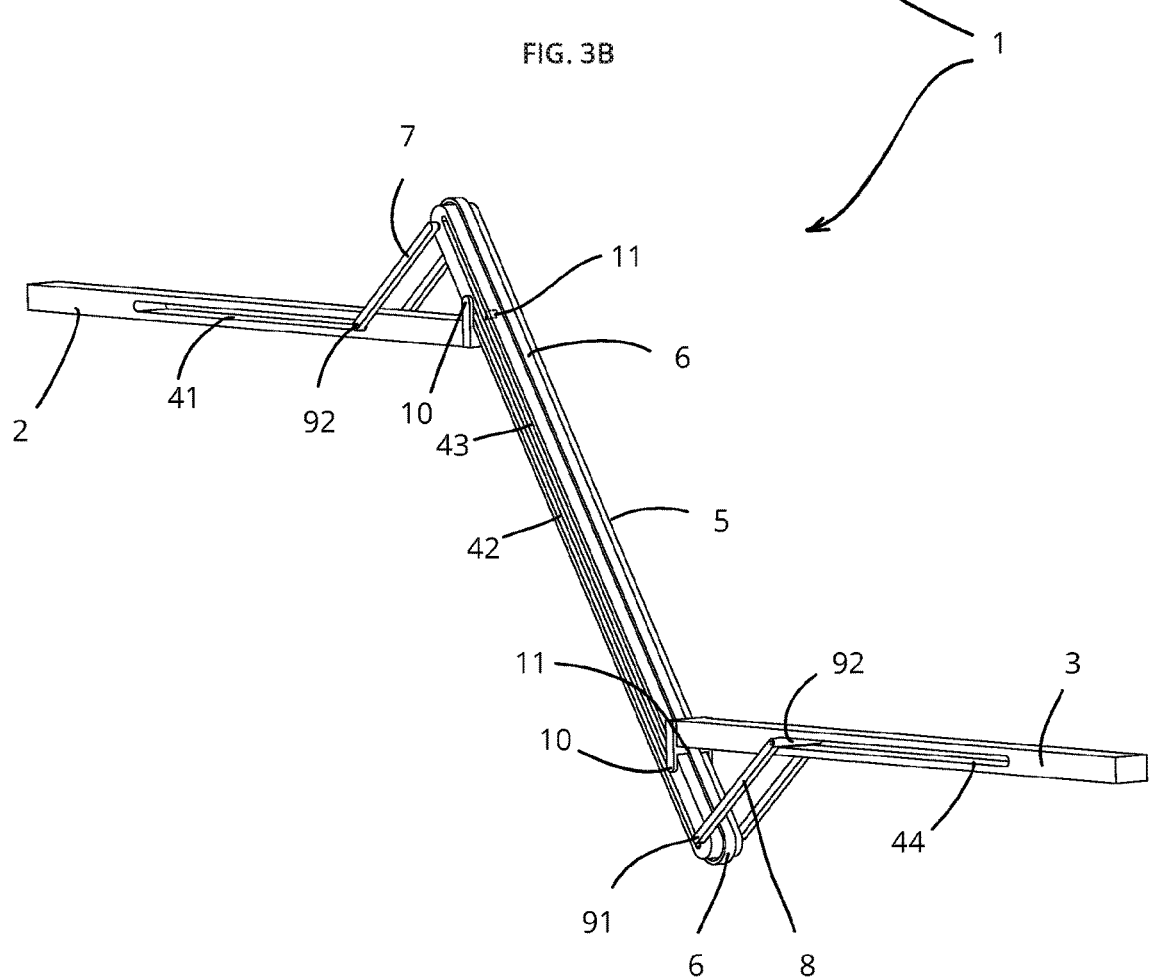

FIGS. 3A-3B show another embodiment of the raising and lowering device 1 according to the present invention, in which FIG. 3A shows the raising and lowering device 1 in an almost retracted position and FIG. 3B shows the raising and lowering device 1 in an extended position.

The first beam 2 is suitably designed to be connected to, for example, a roof of a vehicle (not shown) and the synchronizing element 6 via a bracket 11. The first beam 2 is further formed with a guiding device in the form of a slot or groove 41 extending in the longitudinal direction of the first beam 2, to form a guiding device for a control device 92 connected to the strut 7, the strut 7 being rotatably supported to the profile element 5. Such a control device 92 may in this embodiment, for example, be a sliding element in the form of a roller, block, carriage, axle or the like. The design and operation of the control device 92 will be explained in more detail with reference to FIGS. 11A-11B.

The profile element 5 is further formed with grooves or slots 42, 43, where the grooves or slots 42, 43 form a guiding device to receive a control device 10 connected to a bracket 11, where the control device 10 being constituted by rolls, blocks or the like coupled to the first, respectively, the second beam 2, 3. The profile element 5 is further, through pivotal connections 91 in the form of a bolt or similar coupled to struts 7 and 8. The synchronizing element 6 is rotatably supported at each end of the profile element 5 and is further connected to the first and second beam 2, 3 via brackets 11.

The second beam 3 is, in a similar way as the first beam 2, formed with a bracket 11 and coupled to the synchronizing element 6 via the bracket 11. Further, the second beam 3 is formed with a slot or groove 44 to form a guiding device for a control device 92 which is connected to strut 8. The control device 92 is constituted by a sliding element with a rotational possibility in the form of a roller, block, carriage, shaft or the like.

A lock (not shown) allows the profile element 5 to rotate relative to the first and second beams 2, 3 when the control devices 92 are pulled out from the retracted position of the raising and lowering device 1, where the control devices 92 then are located at one end of slots or grooves 41, 44 forming the guiding device, and where the control device 92 are guided to an opposite end of the grooves or slots 41, 44.

A person skilled in the art will appreciate that the various guiding devices 41, 42, 43 and 44 and associated control devices 92 can be configured as a combination of the embodiments according to FIGS. 2A-2B and 3A-3B.

Through the above-described configuration of the raising and lowering device 1, the brackets 11 and the associated control devices 10 of the first and second beams 2, 3 will move in the longitudinally formed slots or grooves 42, 43 formed in the profile element 5 while the struts 7, 8 and the associated control devices 92 will move in the longitudinally shaped slots or grooves 41, 44 formed in the first and second beams 2, 3 respectively.

Figure 4A:
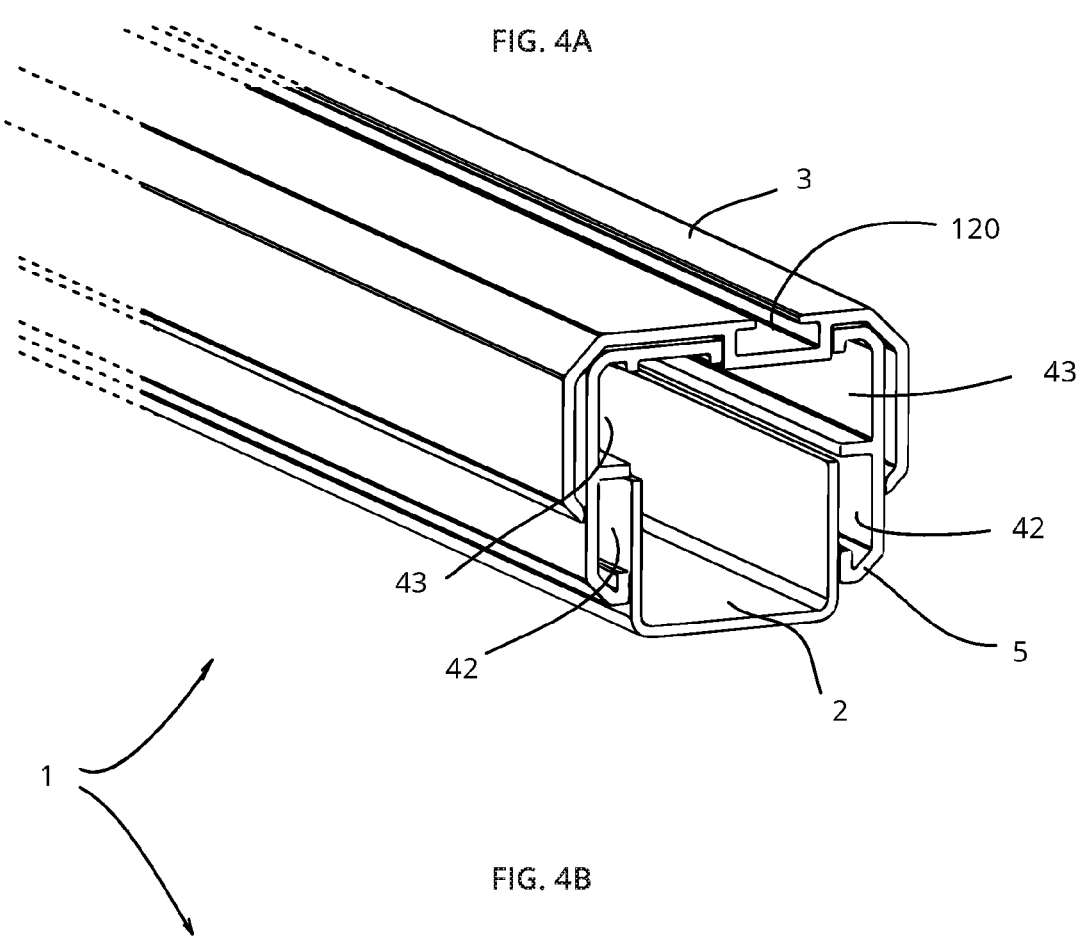
FIGS. 4A-4B show details of the raising and lowering device for support of load according to FIGS. 2A-2B, where
Figure 4B:
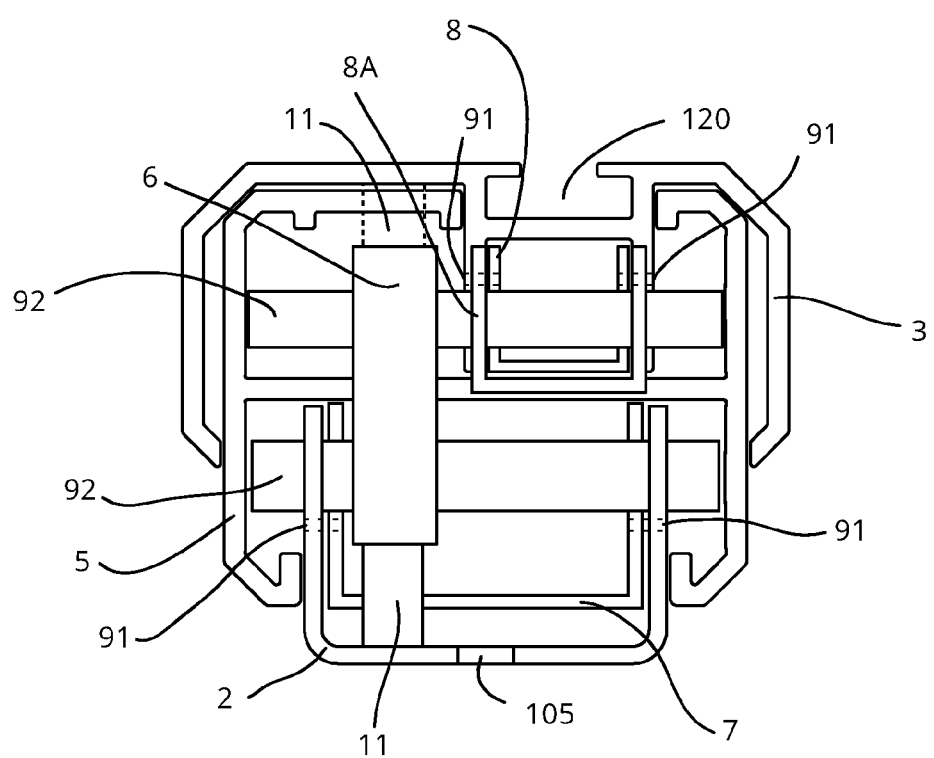

FIGS. 4A-4B show a composition of the elements of the raising and lowering device 1 according to the embodiment of the raising and lowering device described in FIGS. 2A-2B. FIG. 4A shows a perspective view of the profile element 5, the first beam 2 and the second beam 3 in a retracted position, while FIG. 4B shows the raising and lowering device 1 in a cross-section and where the different elements are shown arranged asymmetrically about a center plane or a center line S.

A first beam 2 is formed with grooves or slits 105 in order to be able to be attached to a desired surface, for example a roof of a vehicle, a cabinet or the like.

The first beam 2 is, via a pivot connection 91, connected to the strut 7 and via a bracket 11 connected to the synchronizing element 6. The strut 7 is furthermore at the opposite end through a sliding and pivot connection 92 connected to a guiding device 42 in the form of a groove in the profile element 5, where the sliding and pivot connection 92 acts as a control device for guiding device 42. A corresponding guiding device 43 is similarly arranged at an opposite end of the profile element 5 and acting similarly for a corresponding control device 92, where the control device 92 is arranged at one end of the strut 8.

The pivot connections 91, 10 may for example be constituted of a bolt and nut or the like.

A second beam 3 is formed with a slot or groove 120 in order to attach the desired load to the raising and lowering device 1.

The second beam 3 is further, at its one end and through a bracket 11, pivotally connected to the synchronizing element 6. The second beam 3 is also connected to the profile element 5 through the strut 8, the strut 8 is further being connected to a coupling strut 8A.

Figure 5:
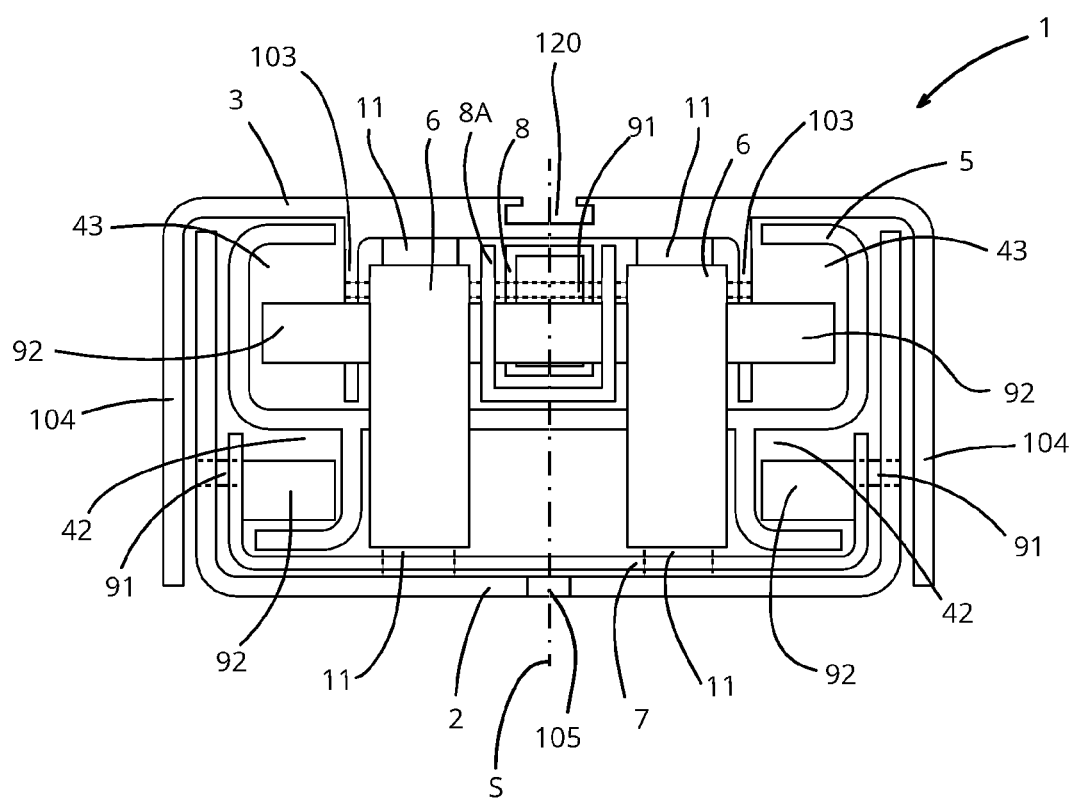
FIG. 5 shows details of an alternative embodiment of the raising and lowering device for support of load according to FIG. 1, in a cross-section and in a retracted position, where the embodiment shows a symmetrical location of the various elements about a center line.

FIG. 5 shows an alternative embodiment of the raising and lowering device 1 in a retracted position, where the raising and lowering device 1 is shown in a cross-section and where the different elements are shown arranged symmetrically about a center plane or center line S.

Two synchronizing elements 6, which in this embodiment comprises cogged transmission belts (not shown), extending substantially over and around an outer surface of the profile element 5, are arranged on either side of the center plane or center line S and equidistant therefrom. Furthermore, each of the synchronizing elements 6 are, via the brackets 11, connected to the first and second beams 2, 3, so as to hold the brackets 11 at a constant distance from each other in the path of the synchronizing elements 6. The strut 7 is U-shaped and is pivotally connected to the first beam 2 via two pivot connections 91, and the strut 7 is further connected to the profile element 5 via a slide and pivot connection 92, through the guiding device in the form of the slots or grooves 42. The strut 8 is pivotally connected to the second beam 3 via a pivot connection 91 and further through a coupling strut 8A connected to the profile element 5 via a slide and pivot connection 92 through the guiding device in the form of the slots or grooves 43.

Figure 17A:
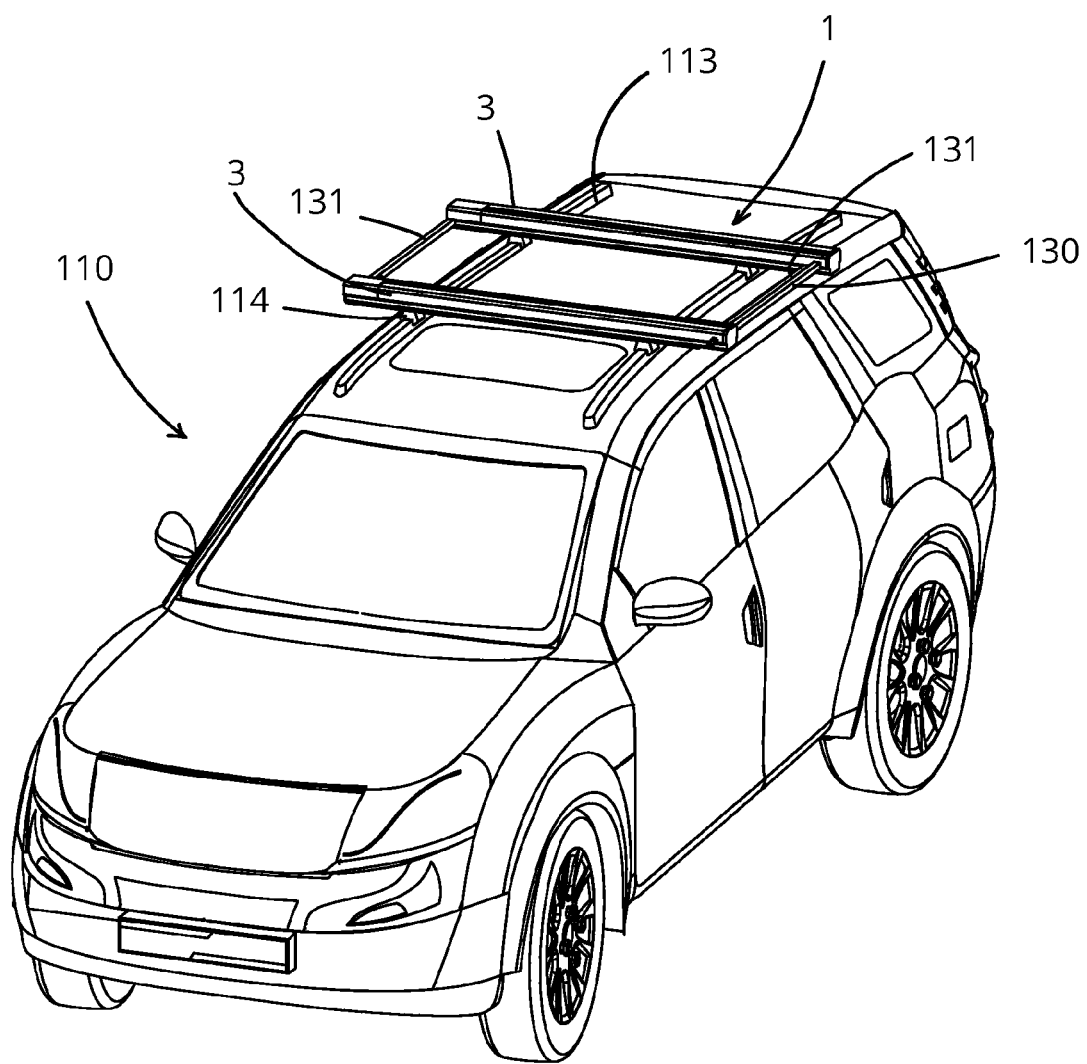
Figure 17C:
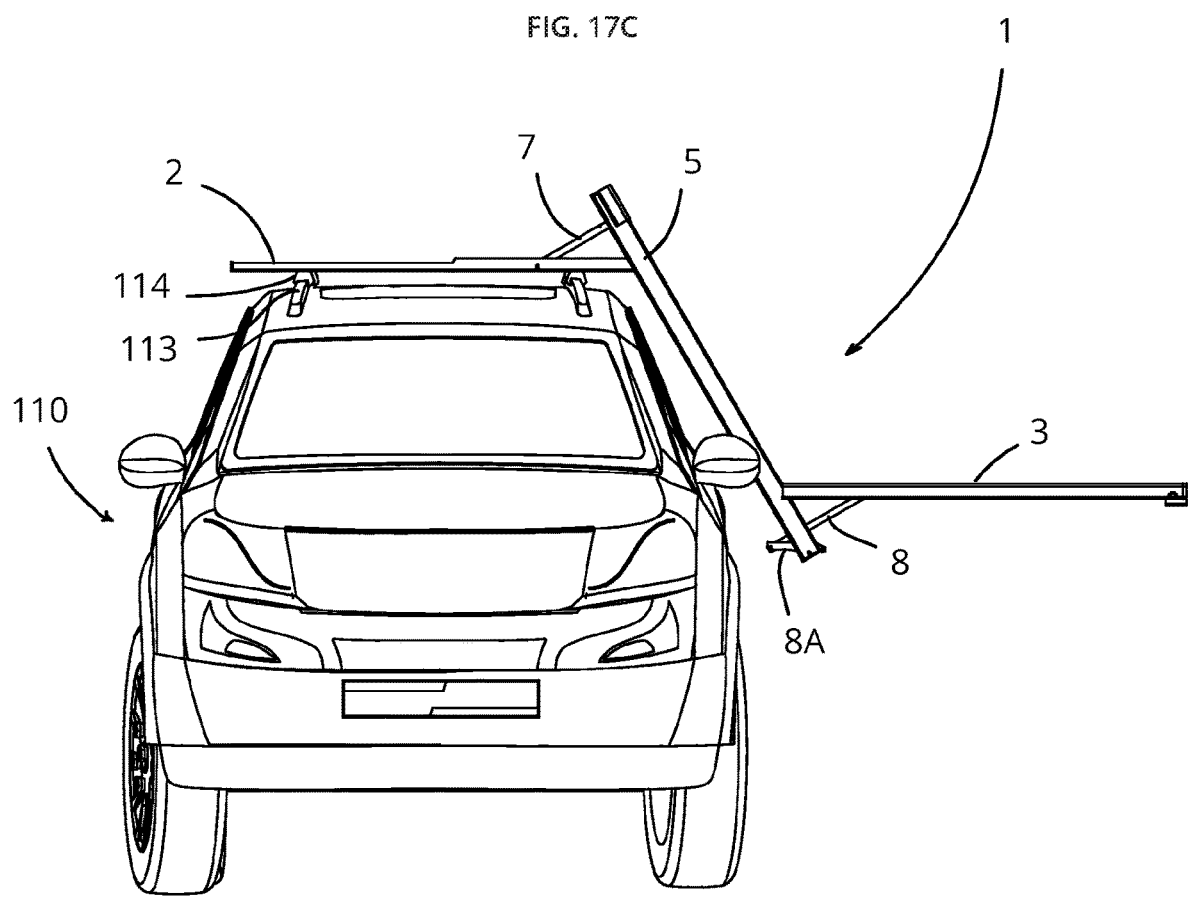
Figure 17D:
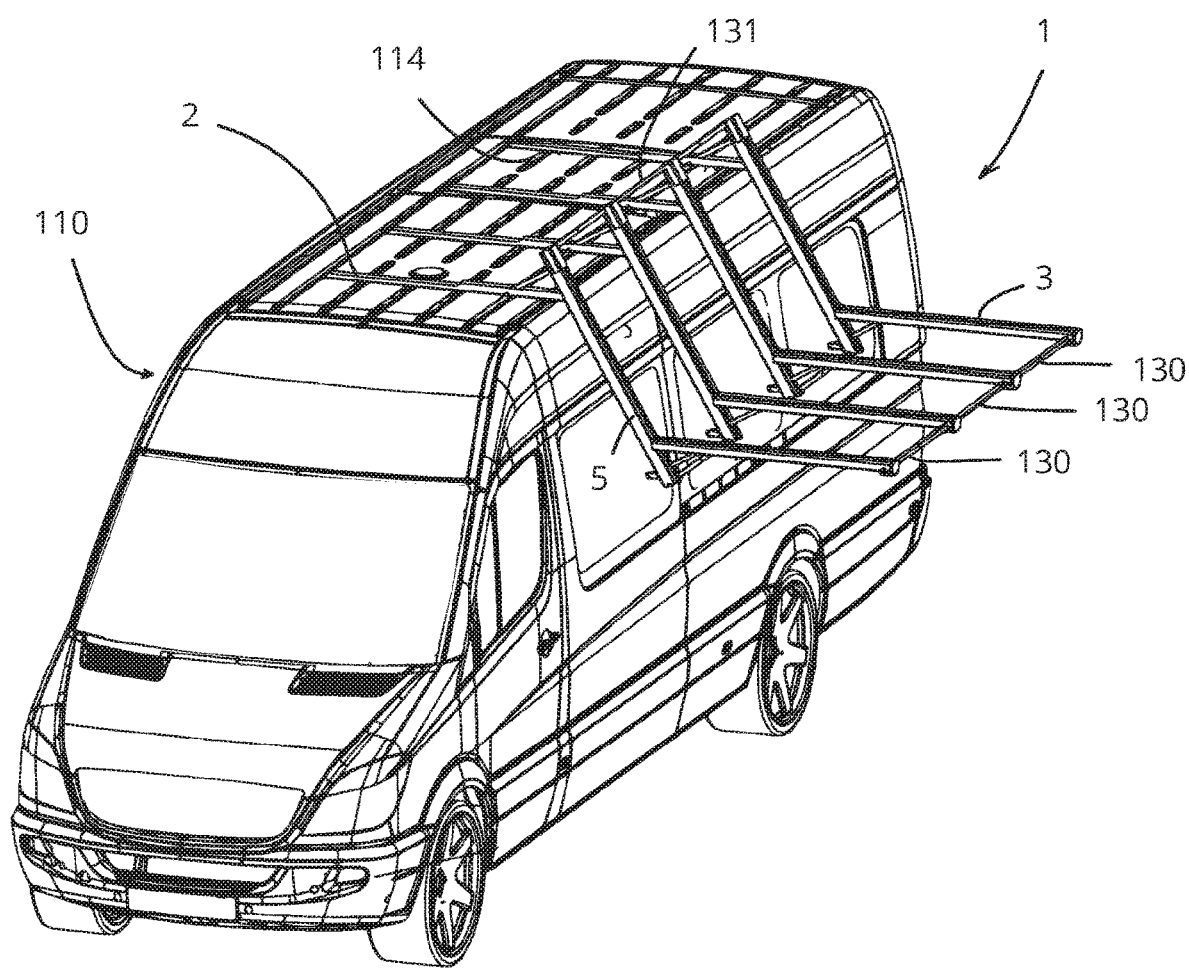

The first beam 2 is on a side facing, for example, a vehicle 110, see also FIGS. 17A-17C, in suitable ways designed to be connected to the vehicle roof through a load holding brackets 114, see also FIGS. 17A-17C. The first beam 2 will then be formed with one or more longitudinal slots or grooves 105 for receiving one or more load holding brackets 114. The first beam 2 is further U-shaped, so as to accommodate or hold the profile element 5, the struts 7, 8 and the synchronizing elements 6, when the raising and lowering device for support of load 1 is in its retracted position.

The second beam 3 is formed with outer side walls 104 in order to overlap at least a portion of the side walls of the U-shaped first beam 2, inner side walls 103 to allow the connections between the beam 3 and the profile element 5, and is formed, on an outer surface, with a longitudinal slot or groove 120 which extends over the length of the second beam 3.

Figure 6:
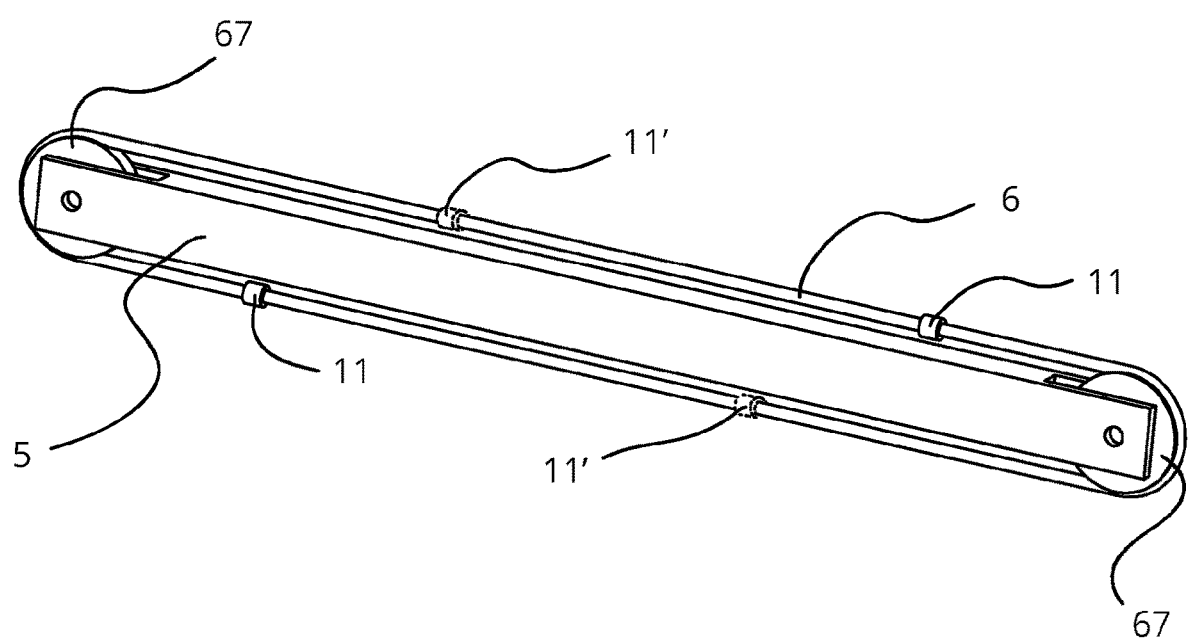
FIG. 6 shows details of a synchronizing element of the raising and lowering device for support of load according to the present invention, where the synchronizing element is performed as a closed or endless loop along the profile element.

FIG. 6 shows possible embodiments and details of the synchronizing element or synchronizing elements 6 which can be used with the raising and lowering device 1 for support of load according to the present invention.

FIG. 6 shows a synchronizing element 6 made as an endless loop in the form of a toothed belt, chain, strap, belt, wire, rope or the like. The synchronizing element 6 is tightened and extends around two pinions 67, gearwheels or the like, which are supported at each end of the profile element 5. The brackets 11 which are connected to the first and second beams 2, 3 respectively, will move in opposite direction of each other when synchronizing element 6 moves, upon operation of the raising and lowering device 1.

In FIG. 6, the first beam 2 is connected to the part of the synchronizing element 6 which extends along a lower side of the profile element 5 through the bracket 11, while the second beam 3 is connected to the part of the synchronizing element 6 which extends along an upper side of the profile element 5 through bracket 11. By moving the raising and lowering device 1 from an extended to a retracted position, the second beam 3 will slide from right to left on the figure, whereby this is shown in that the upper bracket 11 is moved to the left and shown with reference numeral 11'. The lower bracket 11 will then move in the opposite direction, from left to right of the figure and synchronously with the upper bracket 11, shown with reference numeral 11'. The slots or grooves 42, 43 formed in the profile element 5 will then limit which length the first and second beams 2, 3 can move relative to the profile element 5, thereby also restricting the movement of the synchronizing element 6, as the synchronizing element 6 is connected to the first and second beam 2, 3 through brackets 11.

A person skilled in the art will know how an embodiment according to FIG. 6 can be driven with help from a motor or the like, whereby this is not explained any further herein.

Figure 7:
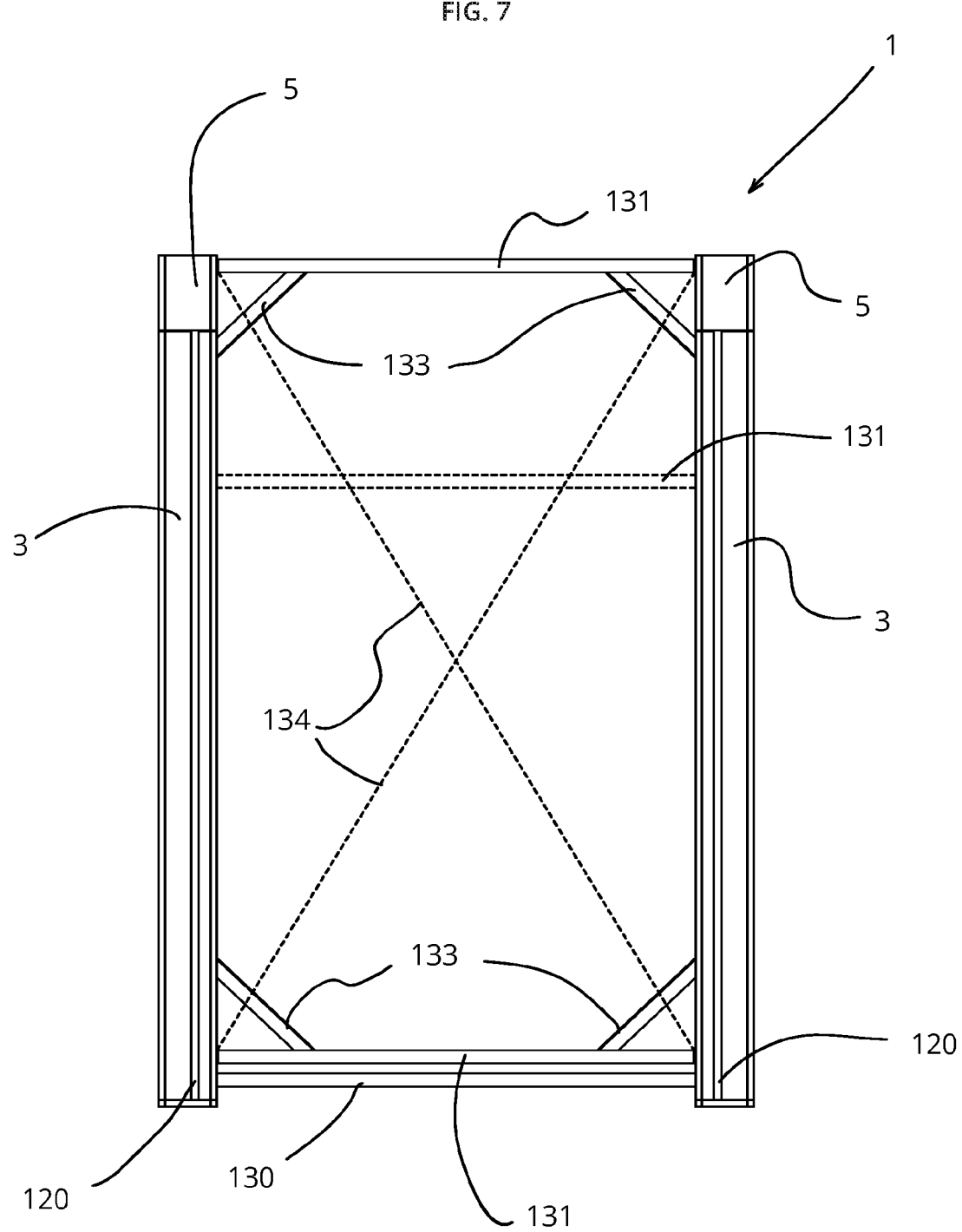
FIG. 7 shows two raising and lowering devices for support of load according to the above embodiments that in an alternative embodiment are connected to each other by a plurality of coupling devices between the elements of the raising and lowering devices, seen from above and in the retracted position.

FIG. 7 shows an embodiment of the present invention comprising two raising and lowering devices 1, in which the two raising and lowering devices 1 are connected and stiffened with two coupling devices, a front coupling device 130 and a rear coupling device 131, the rear coupling device 131 further being stiffened against the raising and lowering device 1 through a support device 133, where the raising and lowering devices 1 are shown in a retracted position and seen from above. A person skilled in the art will appreciate that the raising and lowering devices 1 for support of load in some cases may comprise several such coupling devices, where these may be arranged between the front and rear coupling devices 130, 131, such as, for example, the coupling devices 134 shown with the two dashed lines, on the second beam 3, between the right and left profile elements 5, the synchronizing element 6, the pinion 67, etc. In one embodiment of the raising and lowering device 1, the coupling devices can be made as or accommodating a drive shaft connecting the pinions 67 on the right and left side of the raising and lowering device 1. The drive shaft can be driven from, for example, a crank, motor, or the like (not shown).

The coupling or connecting devices 130, 131 may in one embodiment be telescopic so that the distance between the left and right raising and lowering device 1 may be made shorter or longer (not shown).

Figure 9A:
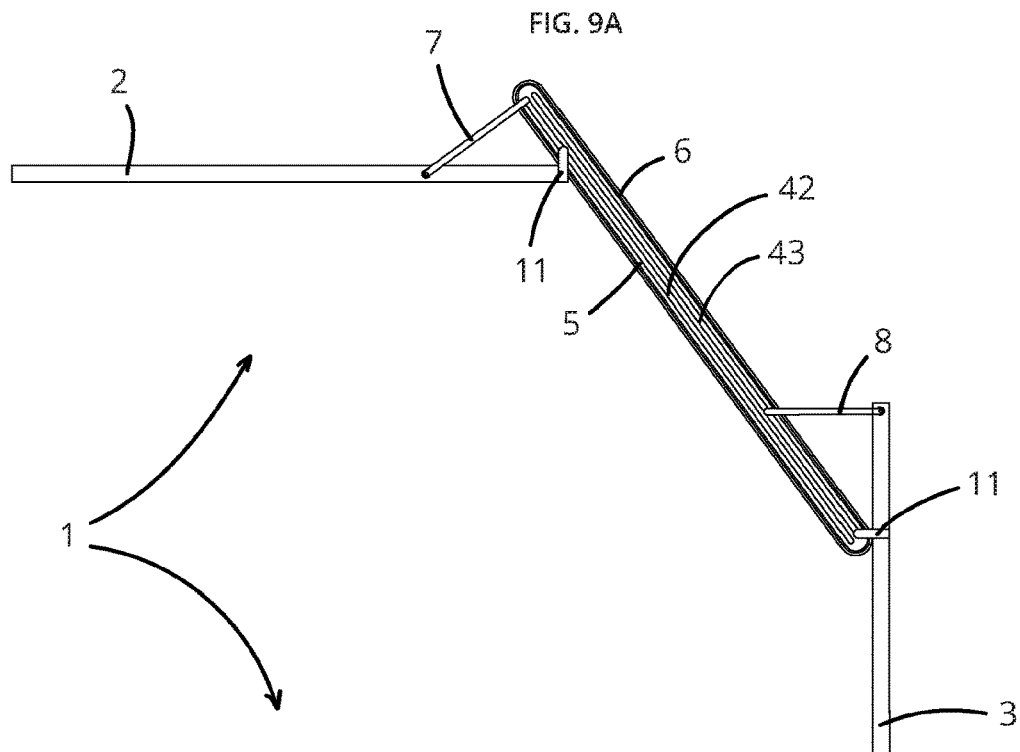
FIGS. 9A-9B show alternative embodiments of the raising and lowering device for support of load according to FIG. 1, where the raising and lowering device in both embodiments is shown in fully extended position.
Figure 9B:
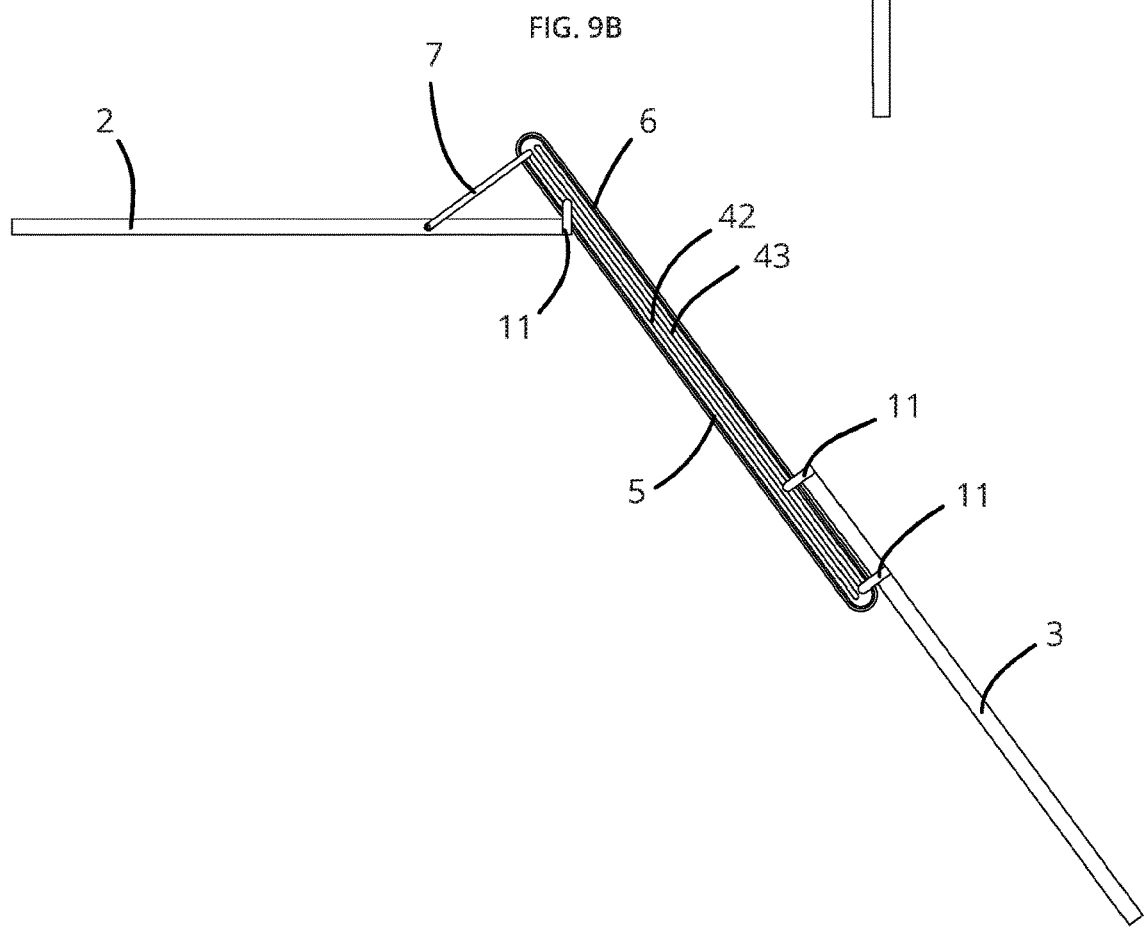

FIG. 8 shows the raising and lowering device 1 for support of load according to one or more of the above embodiments, which in an alternative embodiment are connected to each other with help from several coupling devices 130, 131, seen in perspective from the side in the extended position, FIGS. 9A-9B show details of various alternative embodiments of the raising and lowering device 1 for support of load.

FIG. 9A shows an alternative embodiment of the raising and lowering device 1, where the strut 8 and the bracket 11 have changed position relative to the embodiments shown in FIGS. 1-3. This embodiment results in that the second beam 3 is vertical in an extended position.

FIG. 9B shows an alternative embodiment of the raising and lowering device 1, where the strut 8 is replaced by a bracket 11 which is coupled to the second beam 3, and via a guiding device 10 is slidably connected to the profile element 5. This embodiment results in that the second beam 3 is parallel to the profile element 5 in the extended position.

FIGS. 10A-10E show different embodiments of strut 8 according to one or more of the illustrated embodiments of the raising and lowering device 1 for support of load according to the present invention.

Figure 10A:
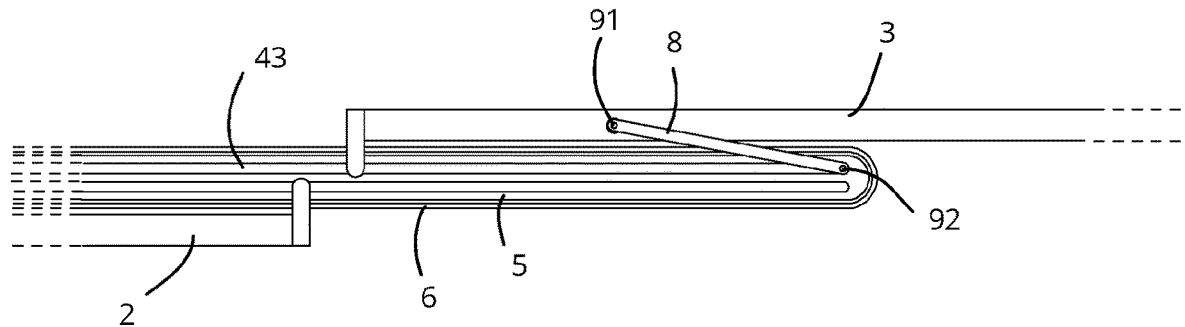
FIGS. 10A-10E show alternative embodiments of struts 8 in the raising and lowering device according to one or more of FIGS. 1-9, where the raising and lowering device is shown in a horizontally extended position.

FIG. 10A shows a strut 8 as described according to FIGS. 1-3.

Figure 10B:
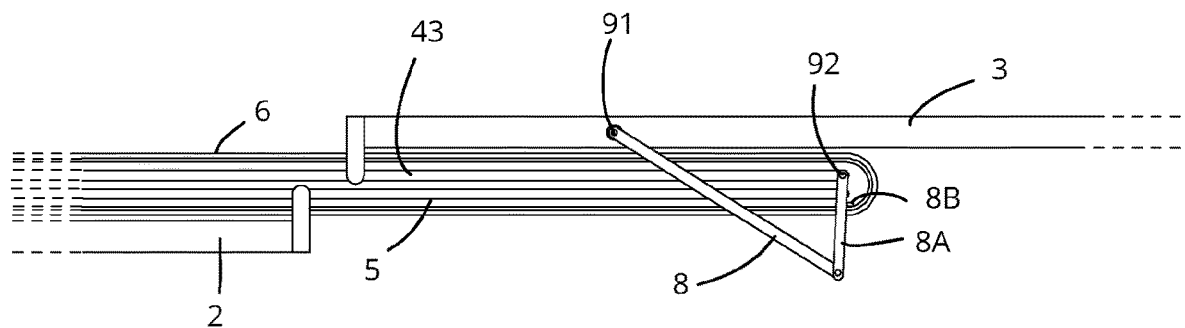

FIG. 10B shows an alternative embodiment of the strut 8, where the strut 8 is pivotally supported to the second beam 3 through the pivot connection 91, and further through a coupling strut 8A is slidably and rotatably connected to the profile element 5, through the coupling strut's 8A control device 92 for the guiding device 43 which is provided in the profile element 5. Further, the profile element 5 is formed with a blocking surface 8B which limits the rotation to the coupling strut 8A. When the raising and lowering device 1 is in the retracted position, the strut 8 and the coupling strut 8A will be arranged parallel to the profile element 5. When the raising and lowering device 1 is pulled from the retracted position to a horizontal extended position, the coupling strut 8A will be pulled out to one end of the guiding device 43. Then, the strut 8 and the coupling strut 8A will form an angle with each other while the second beam 3 further is pulled out horizontally to one end, and the blocking surface 8B limits the coupling strut 8A to rotate too far relative to the profile element 5.

Figure 10C:
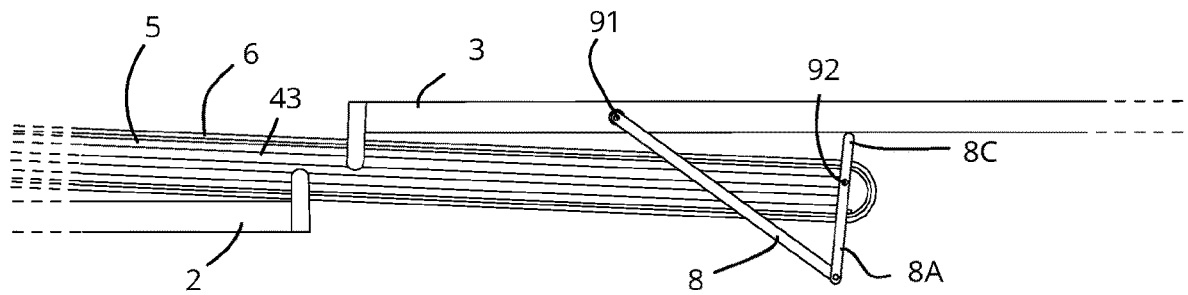

FIG. 10C shows a second alternative embodiment of the coupling strut 8A according to FIG. 10B, where the control device 92 is fixed a distance into the coupling strut 8A, so that one end of the strut 8C will provide a lifting of the second beam 3 from the profile element 5 by pushing on the bottom of the second beam 3.

Figure 10D:
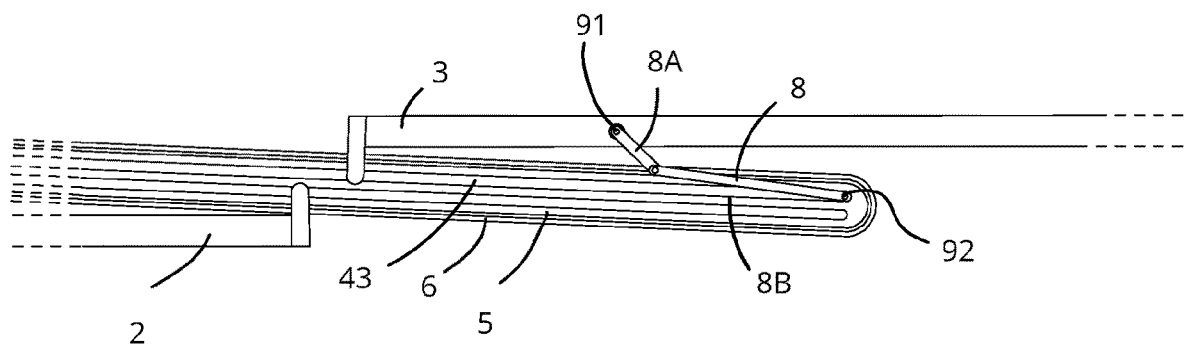

FIG. 10D shows a third alternative embodiment of the coupling strut 8A. When the raising and lowering device 1 is pulled out horizontally, the control device 92 will first be pulled to one end of guide 43, then the strut 8 and coupling strut 8A will form an angle between them, which causes the profile element 5 and the second beam 3 to be pushed away from each other. The underside of the guiding device 43 will here be designed as a blocking surface 8B which prevents the strut 8 from rotating downwardly through the profile element 5.

Figure 10E:
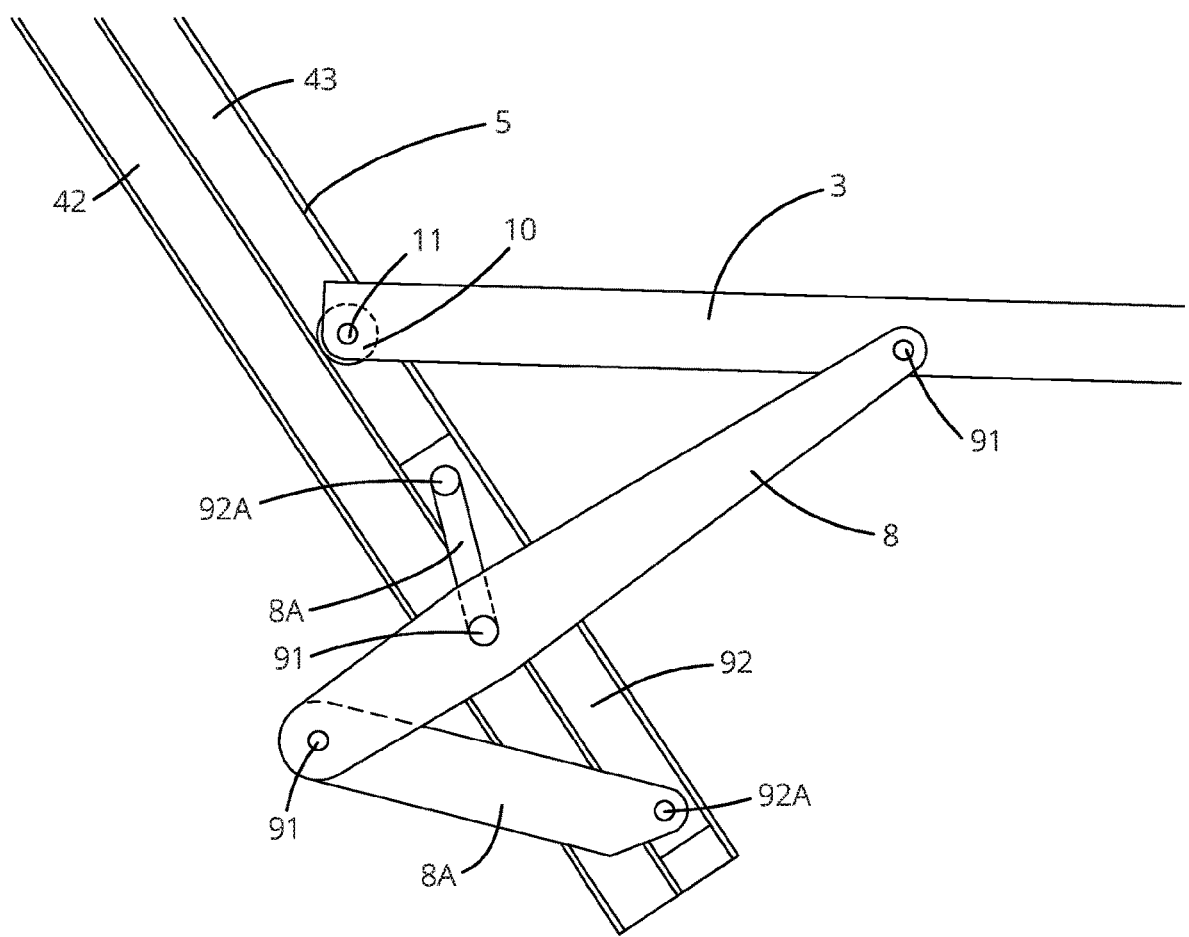

FIG. 10E shows an alternative embodiment of the raising and lowering device 1, where the strut 8 is rotatably connected to the second beam 3 via a pivot connection 91, and via two coupling struts 8A is pivotally connected to the control device 92 which slides in the guiding device 43.

Figure 11A:
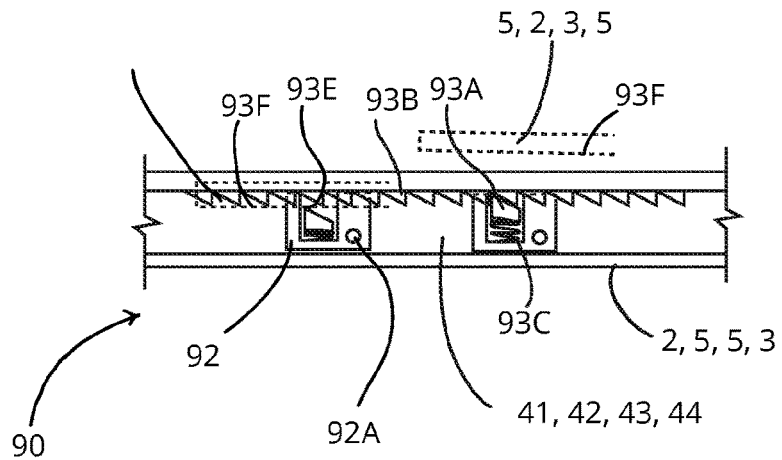
FIGS. 11A-11B show details of locking devices in the raising and lowering device according to the present invention, where
Figure 11B:
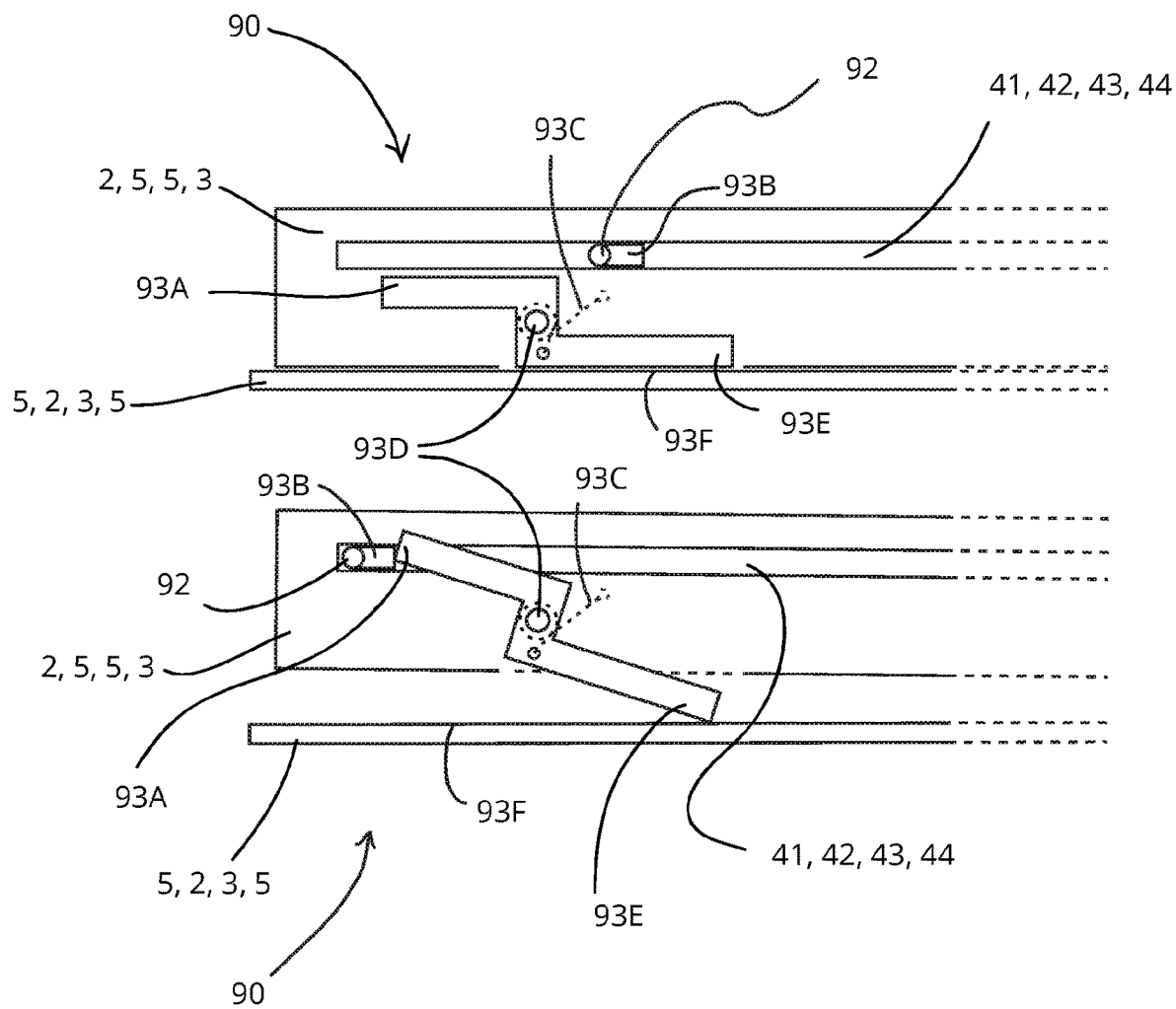

FIGS. 11A-11B show a detailed view of possible locking devices 90 of the raising and lowering device 1 according to the present invention, where the locking device 90 locks the control device 92 from sliding as long as the first and second beams 2, 3 are not parallel to the profile element 5.

FIG. 11A shows a detailed view of a possible design of a control device 92, where the control device 92 comprises a rotatable support point 92A, a spring-loaded lock 93A, 93C. The barbs 93B of the lock are arranged spaced apart from each other, along the roof of the guiding device 41, 42, 43, 44, and prevent 93A, 92 from passing back into the guiding device 41, 42, 43, 44 when the raising and lowering device 1 is pulled out horizontally from the retracted position. A surface 93F is designed to push the spring loaded locking pin 93A into the control device 92 such that the locking pin 93A does not collide with the barbs 93B.

FIG. 11B shows a detailed view of the locking device 90, the control device 92 and the guiding device 41, 42, 43, 44. The control device 92 comprises a roller, carriage or the like, adapted to the guiding device 41, 42, 43, 44.

The topmost illustration shows the raising and lowering device 1 while the profile element 5 is parallel to the first and the second beam 2,3, respectively. The raising and lowering device 1 may, in this position, be pulled horizontally in or out. The locking device 90 comprises a pretensioned spring 93C which allows the locking device 93A, 93E to rotate about its attachment point 93D only when the first or the second beam 2, 3 has rotated relative to the profile element 5 and are no longer parallel. A blocking surface 93B will then prevent the control device 92 from moving back into the guiding device 41, 42, 43, 44.

When the angle between the first and the second beam 2, 3 and the profile element 5 is closed, one end of the locking device 93E will be hit by a surface 93F, which results in that the locking device 93A rotates and allows the control device 92 to pass back.

Figure 12A:
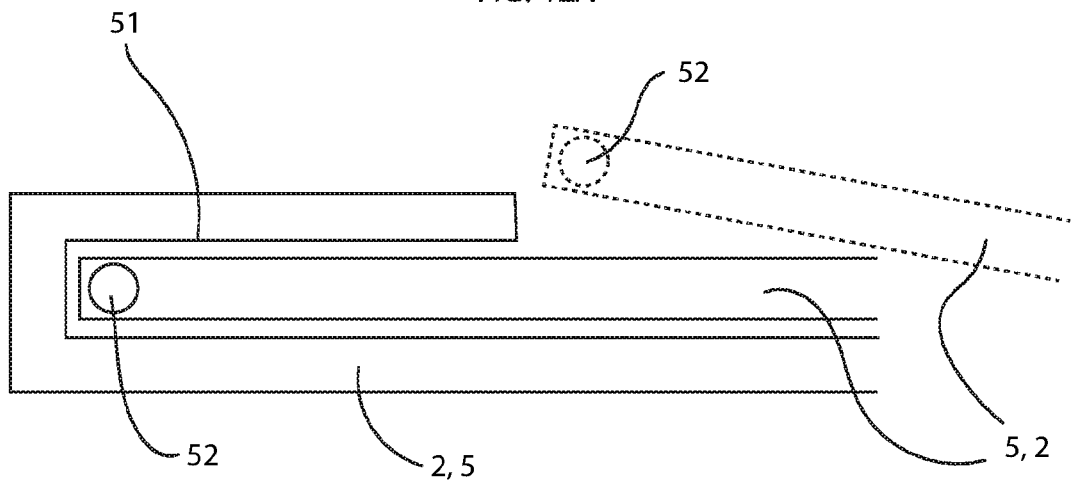
FIGS. 12A-12B show alternative configurations of locking devices in the raising and lowering device according to one or more figures, where
Figure 12B:
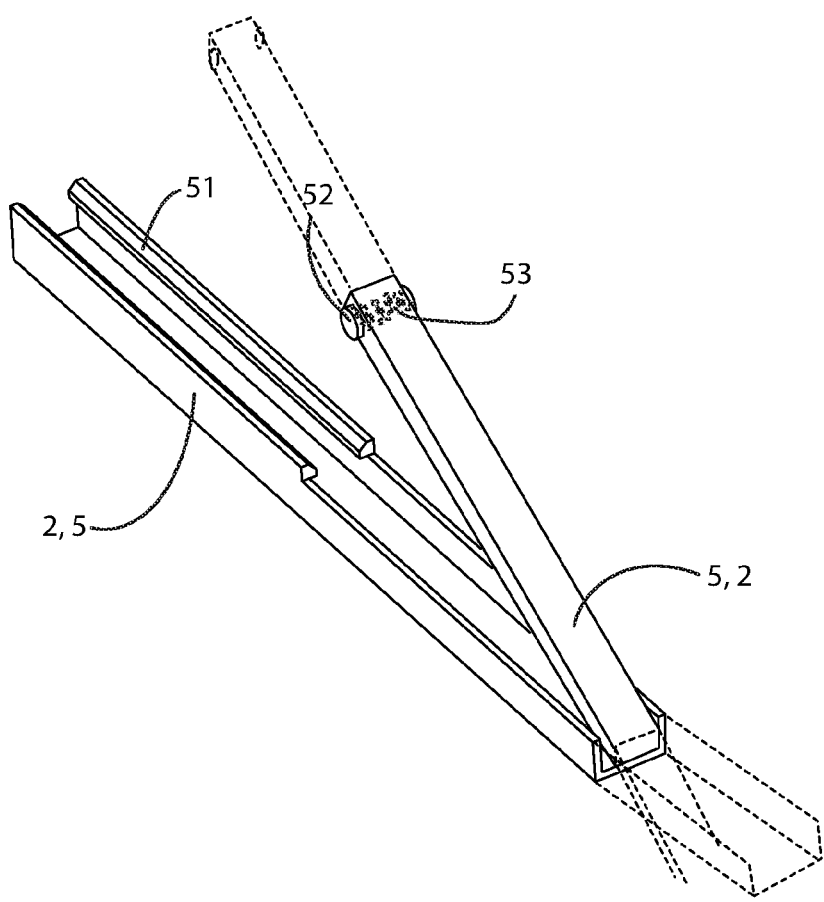

FIGS. 12A-12B show a detailed view of another locking device in the raising and lowering device 1 according to the present invention, where this locking device prevents two elements of the raising and lowering device 1 to rotate relative to each other.

FIG. 12A shows a detailed view of a locking area in the first beam 2 which is formed with a blocking surface 51 which blocks the locking pin 52 coupled to the end of the profile element 5 or vice versa. The profile element 5 may be able to rotate relative to the first beam 2 first when the locking pin 52 is pulled past the end of the blocking surface 51.

FIG. 12B shows the locking area according to FIG. 12A, where the profile element 5 has rotated relative to the first beam 2, or vice versa. The locking pins 52 are preloaded outwardly with a spring 53, and the blocking surface 51 is wedge shaped, so that the locking pin 52 can engage at any place along the locking area and the blocking surface 51.

FIGS. 13A-13B show details of a locking device 62, which is coupled to a control device 92 via a shaft 92A and preloaded with a spring 93C. The synchronizing element 6 comprises an actuation element 61 which interacts with two gripping areas 62D and 62C on the locking device 62, and will push the locking device 62 and the control device 92 back and forth in the guiding device 42, 43. The profile element 5 has a cutout so that when the locking device 62 is pulled over this cutout, the preload of the lock will cause the locking device 62 to rotate and the locking hook 62B engages the barb 62A formed in the profile element 5. After the locking device 62 has rotated to engage, the actuation element 61 may slide out of the locking device 62 and join the synchronizing element 6. To unlock the locking device 62, the synchronizing element 6 is rotated in opposite direction and the actuation element 61 presses against the gripping area 62C and thus releases the locking device 62 and the control device 92 can slide back into the guiding device 42, 43.

FIG. 13B shows an alternative embodiment of the lock according to FIG. 13A.

FIG. 13C shows sectional details of an alternative blocking mechanism. A sliding strut 95 is slidably connected to the profile element 5 and pivotally supported in the first and second beam 2,3, respectively, so that the sliding strut 95 pushes the control device 92 in the guiding device 42, 43 until the control device 92, near an end will, slip into a pocket formed on profile element 5 and be locked by the sliding strut 95 when the raising and lowering device 1 is brought from retracted to extended position.

Figure 14A:
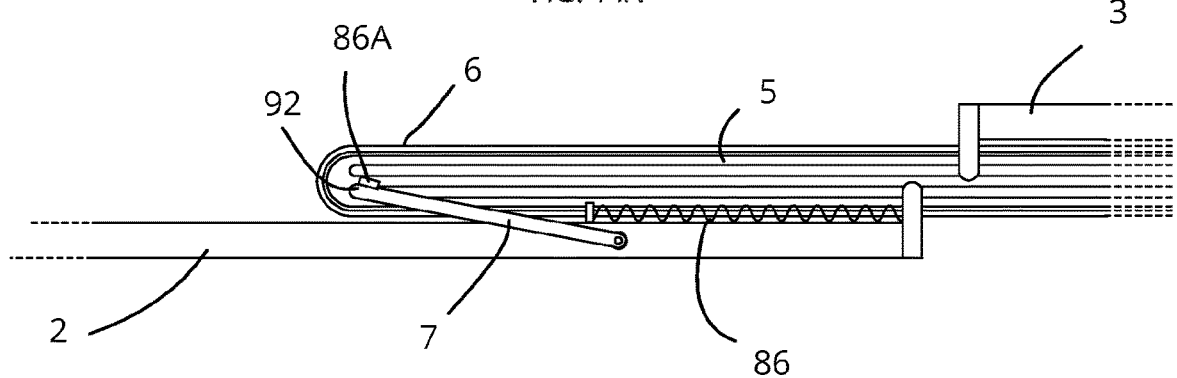
FIGS. 14A-14C show detailed views of alternative blocking devices in the raising and lowering device.
Figure 14B:
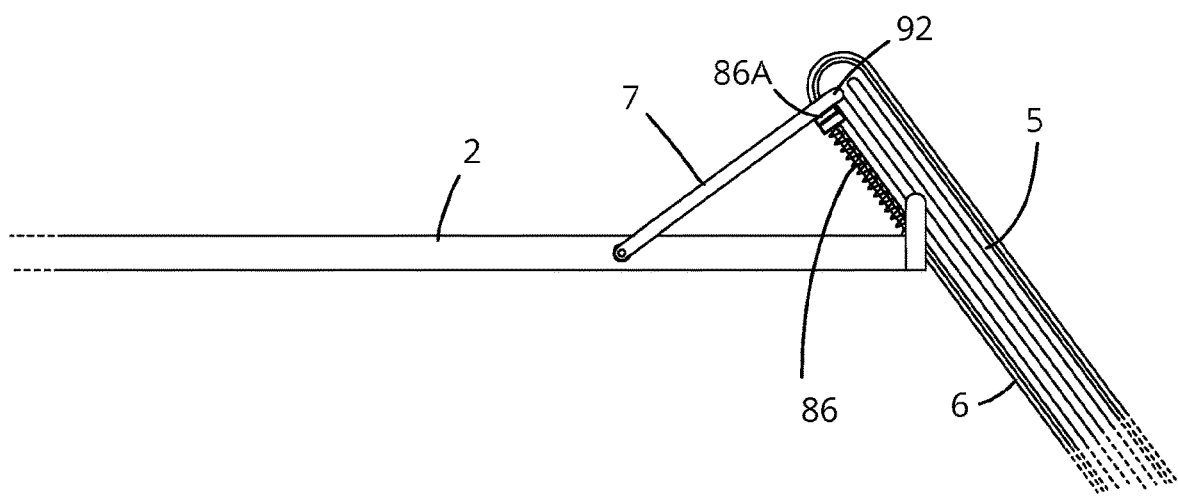
Figure 14C:
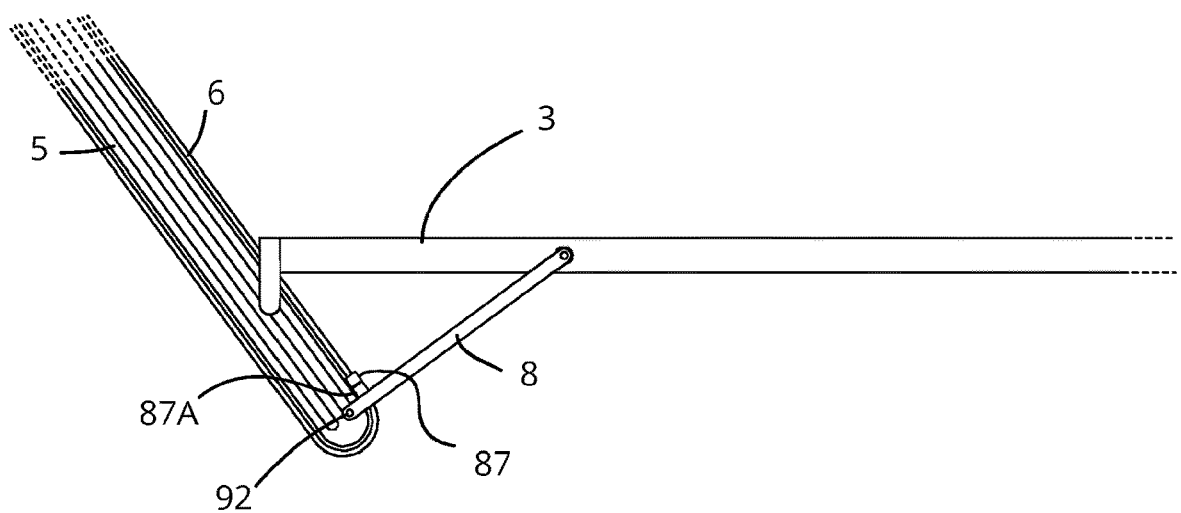

FIGS. 14A-14C show alternative blocking devices for the raising and lowering device 1 according to the present invention, where the FIGS. 14A-14B show an end stop 86 in the form of a spring which is arranged in parallel with the profile element 5. A fitting surface 86A formed on the strut 7 or control device 92 is receiver of the end stop 86 when the system is in an extended position as shown in FIG. 14B.

FIG. 14C shows an alternative blocking device 87, which is coupled to the synchronizing element 6. When the system is in an extended position, the fitting surface 87A, formed on the strut 8 or the control device 92, will prevent the strut 8 and the control device 92 from moving back into the guiding device 43.

FIG. 15 shows a locking device 66 to ensure that the raising and lowering device 1 for support of load according to the present invention is not lowered/raised unintentionally, for example during transport by vehicle, where the raising and lowering device 1 for support of load 1 through the locking device 66 is locked in a particular position, for example, a retracted position.

The locking device 66 comprises a locking pin 68 and a locking hole 69 formed at least in the first and second beams 2,3 but it is to be understood that also the profile element 5 may be formed with locking holes 69. The locking pin 68 and locking hole 69 will in appropriate ways cooperate with each other to allow locking or unlocking of the raising and lowering device 1.

Figure 16A:
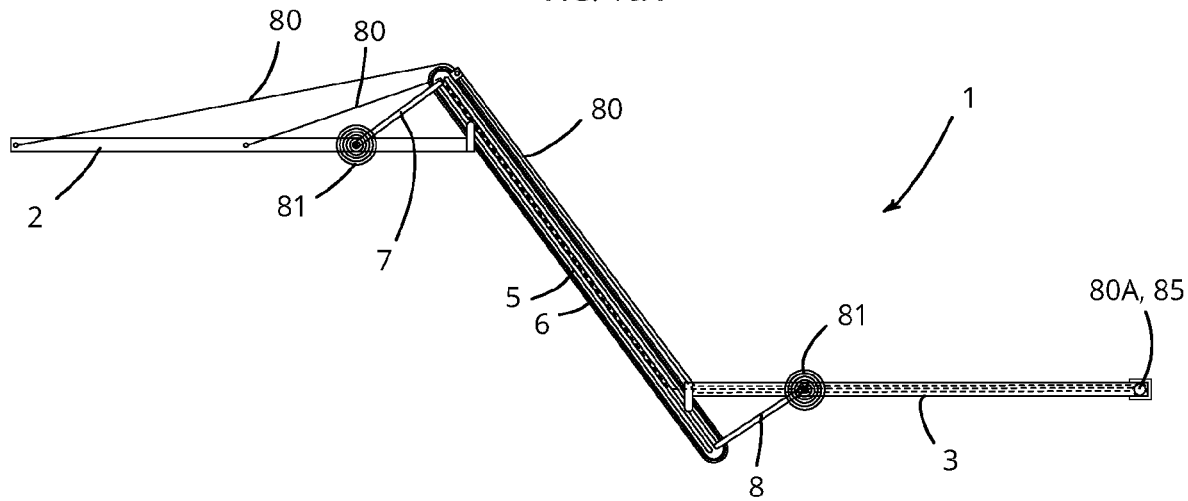
FIGS. 16A-16C show various assisting devices in order to facilitate the handling of the raising and lowering device for support of load when the raising and lowering device is brought from a retracted position to an extended position or from an extended position to a retracted position.
Figure 16B:
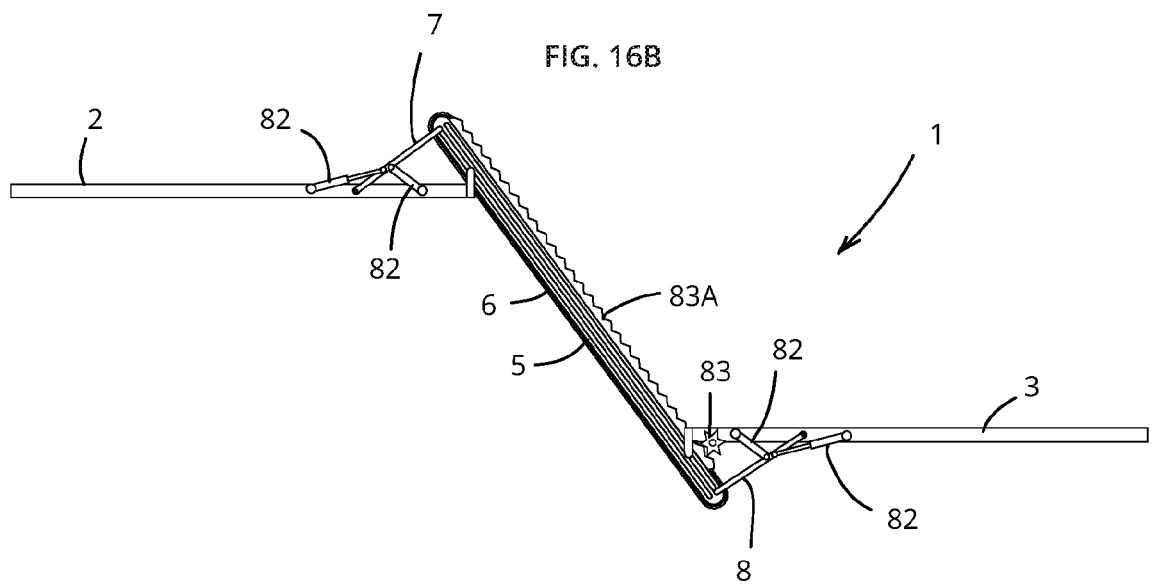
Figure 16C:
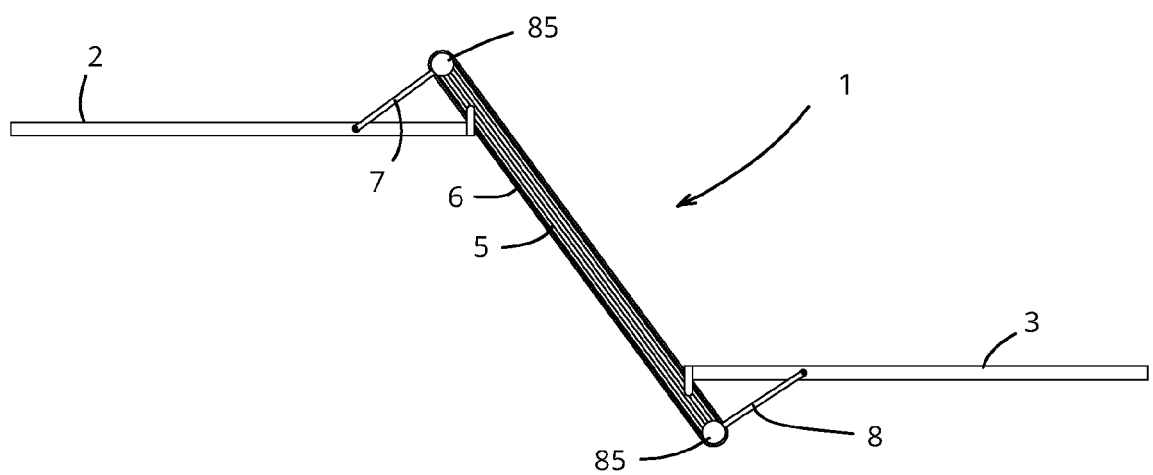

FIGS. 16A-16C show various assisting devices to ease the handling of the raising and lowering device 1 according to the present invention when the raising and lowering device 1, for example, is brought from a retracted position to an extended position or from an extended position to a retracted position. The assisting devices may be assigned to help the user operate the system or to limit the system's motion.

FIG. 16A shows arrangement of the number of rotary devices 81 to provide lifting power or damping of motion. These can be designed as torque springs, coil springs, motors, rotary dampers or the like.

A winch device 80A is shown coupled with three embodiments of strap 80, where the strap can be winch in about a shaft in 80A, and in three different embodiments is attached to the opposite end of the first beam 2; approximately in the middle of the first beam 2; opposite end of the profile element 5. Further, the shaft in 80A may be preloaded in one direction of its rotation so as to always hold the strap 80 tight in all positions of the raising and lowering device 1. The pretension of the shaft in 80A may be achieved by using a bell spring in combination with a one-way bearing (not shown).

FIG. 16B shows numerous linear devices 82 that can push, pull or dampen the raising and lowering device 1. These linear devices may be, for example, gas springs, steel springs, one or more hydraulic or pneumatic pistons, one or more linear motors, viscous dampers or similarly, arranged between the different elements. Further, a gear wheel 83 is arranged to climb on a toothed rack 83A, where the gear wheel can be driven by a motor (not shown) or dampened via a rotary damper.

FIG. 16C shows a detachable motor 85 which can be attached to the one or the other pinion 67 of the synchronizing element 6 so as to drive the raising and lowering device 1 between a retracted position and an extended position or vice versa.

Figure 17E:
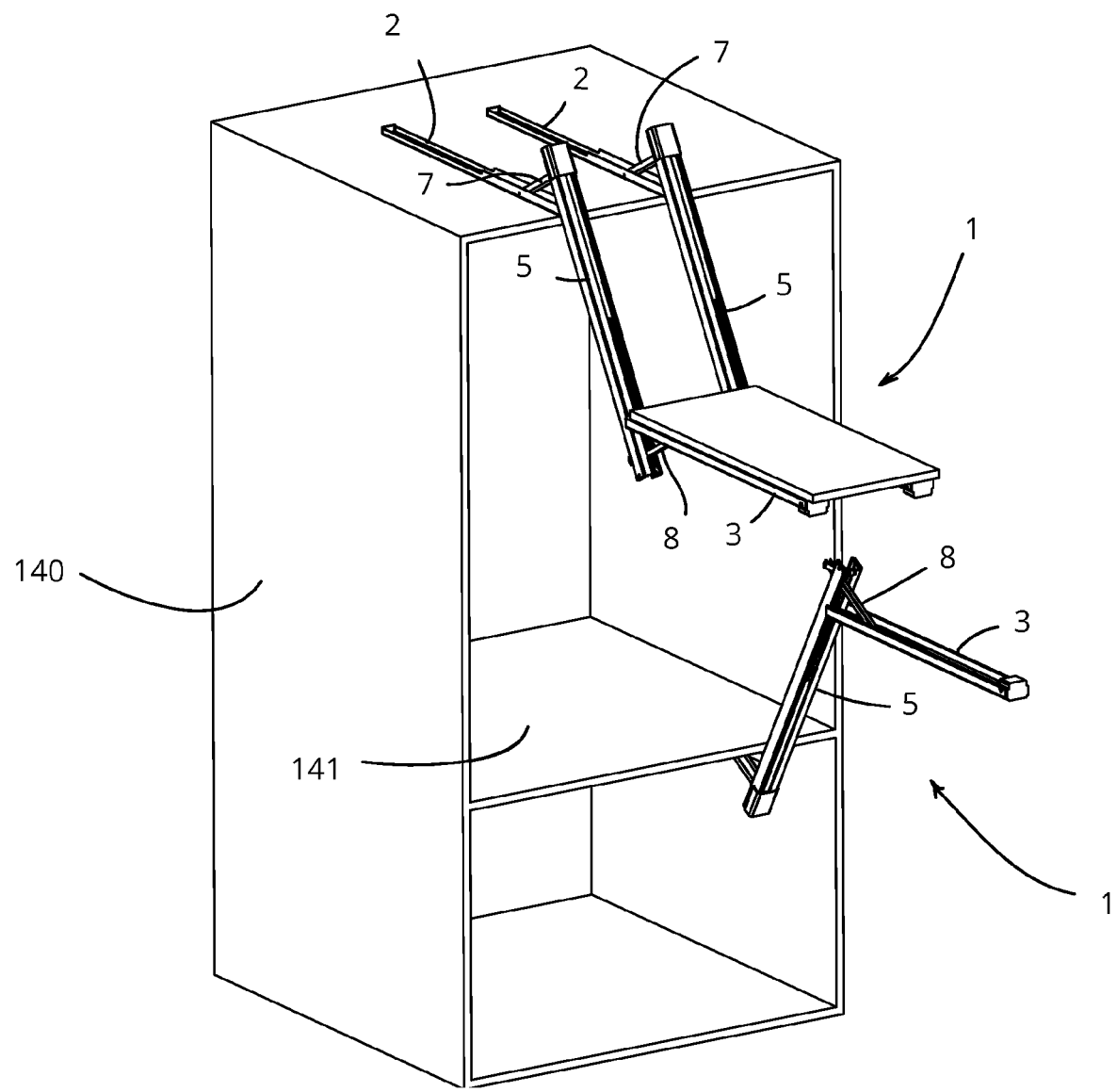

FIGS. 17A-17E show different areas of application of the raising and lowering device 1 according to the present invention, where the FIGS. 17A-17D show several interconnected raising and lowering devices 1 arranged on vehicle 110, in perspective view and front view, where the second beams 3 of the raising and lowering devices 1 are connected to each other through transverse struts 130 and the profile elements 5 are connected to each other through transverse struts 131 so as to stabilize each other and the raising and lowering devices 1, while FIG. 17E shows several raising and lowering devices disposed in cabinet 140, on top of the cabinet 140, and in underside of a shelf 141 in the cabinet 140.

In FIGS. 17A-17C, the raising and lowering device 1 is arranged and connected to the roof rails 113 of the vehicle with help from a number of fastening elements in the form of, for example, a load holding bracket 114. The first beam 2 is then formed with one or more longitudinal slots or grooves 105, see also the FIGS. 4B and 5, in order to receive one or more load holding brackets 114. The load holding brackets 114 are connected to the roof rails 113 of the vehicle with help from its own suitable means.

Figure 18:
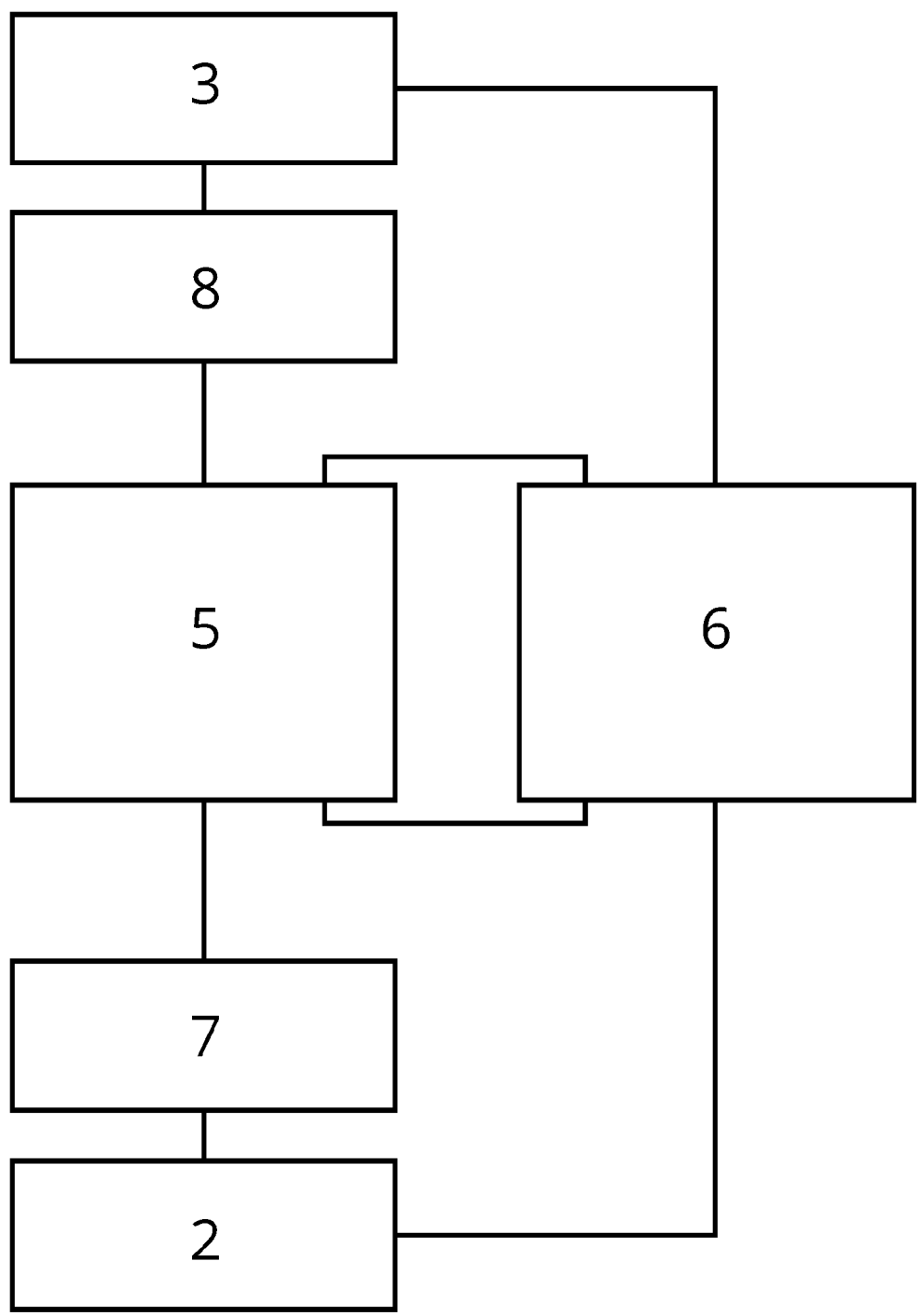
FIG. 18 shows a schematic representation of how the various elements of the raising and lowering device for support of load are connected to each other.

FIG. 18 shows a schematic representation of the main elements 2, 3, 5, 6, 7 and 8 of the raising and lowering device 1 and their connection and cooperation.

The present invention has now been explained with reference to several non-limiting exemplary embodiments. However, one skilled in the art will understand that numerous variations and modifications of the raising and lowering device for support of loads as described within the scope of the invention can be performed as defined in the appended claims.

The invention claimed is:

1. A raising and lowering device for support of a load, comprising:
    a first beam;
    a second beam; and
    at least one profile element,
    wherein each of the first and the second beam is connected to the at least one profile element through at least one strut, where one end of the at least one strut is a slide and pivot connection and an opposite end of the at least one strut is a pivot connection,
    wherein the raising and lowering device further comprises at least one synchronizing element rotatably supported at each end of the at least one profile element, and
    wherein the at least one synchronizing element extends in a loop substantially around the entire length of the at least one profile element, wherein the at least one synchronizing element is connected to each of the first and second beams, via a bracket, such that the first and second beams are movable relative to each other between a retracted position and an extended position of the raising and lowering device.

2. The raising and lowering device according to claim 1, wherein the brackets between the at least one synchronizing element and the first and second beams move at equal speed relative to the at least one profile element when the raising and lowering device is brought between the retracted and the extended position.

3. The raising and lowering device according to claim 1, wherein the at least one synchronizing element consists of a cam belt, a cord, a strap, a belt, or a wire.

4. The raising and lowering device according to claim 1, wherein the first beam is formed with a guiding device for a control device connected to the at least one strut.

5. The raising and lowering device according to claim 4, wherein the guiding device comprises slots or grooves, and the control device comprises a bolt, a pin, a roller, or a carriage.

6. The raising and lowering device according to claim 4, wherein the guiding device extends over a length of the first beam, and/or the at least one profile element, and/or the second beam.

7. The raising and lowering device according to claim 1, wherein the second beam is formed with a guiding device for a control device connected to the at least one strut.

8. The raising and lowering device according to claim 1, wherein the at least one profile element is formed with at least one guiding device for a control device connected to the at least one strut and/or for a control device connected to the first or second beam.

9. The raising and lowering device according to claim 1, wherein a control device of the at least one strut is coupled off or on the at least one synchronizing element via a coupling device.

10. The raising and lowering device according to claim 1, further comprising at least one rotating or linear assisting device.

11. The raising and lowering device according to claim 1, wherein the at least one synchronizing element comprises a driving device in the form of a motor.

12. The raising and lowering device according to claim 1, further comprising at least one locking device configured to lock the load in a position.

13. The raising and lowering device according to claim 1, wherein the second beam comprises a U-shaped profile forming a space for reception of the first beam, the at least one profile element, and the at least one synchronizing element in the retracted position of the raising and lowering device.

14. The raising and lowering device according to claim 1, wherein a coupling strut is pivotally connected to the at least one profile element and/or the at least one strut.

15. The raising and lowering device according to claim 1, further comprising one or more coupling devices for stiffening of the raising and lowering device.

16. The raising and lowering device according to claim 1, wherein the at least one strut is pivotally and slidably connected to the second beam and/or the at least one profile element via at least one coupling strut.

17. The raising and lowering device according to claim 1, wherein the first beam is connected to a roof of a vehicle via a load holding bracket.

18. A system for support of a load, wherein the system comprises one or more raising and lowering devices for support of the load according to claim 1.

* * * * *